United States Patent
Asada et al.

(10) Patent No.: US 10,576,526 B2
(45) Date of Patent: Mar. 3, 2020

(54) WORKPIECE CONVEYING SYSTEM, AND WORKPIECE CONVEYING METHOD

(71) Applicants: KOMATSU INDUSTRIES CORPORATION, Kanazawa-shi, Ishikawa (JP); YOROZU CORPORATION, Yokohama-shi, Kanagawa (JP)

(72) Inventors: Kazuki Asada, Kanazawa (JP); Naoki Yamashiro, Kanazawa (JP); Yoshitaka Tani, Nomi (JP); Kazuyuki Sakemoto, Kanazawa (JP)

(73) Assignees: KOMATSU INDUSTRIES CORPORATION, Ishikawa (JP); YOROZU CORPORATION, Kanagawa (JP)

(*) Notice: Subject to any disclaimer, the term of this patent is extended or adjusted under 35 U.S.C. 154(b) by 0 days.

(21) Appl. No.: 16/026,438

(22) Filed: Jul. 3, 2018

(65) Prior Publication Data
US 2020/0009638 A1 Jan. 9, 2020

(51) Int. Cl.
 *B21D 43/02* (2006.01)
 *B65G 43/00* (2006.01)
 *B25J 13/08* (2006.01)

(52) U.S. Cl.
 CPC ............ *B21D 43/02* (2013.01); *B65G 43/00* (2013.01); *B65G 2811/0621* (2013.01)

(58) Field of Classification Search
 CPC ........... B21D 43/02; B65G 43/00; B25J 13/08
 (Continued)

(56) References Cited

U.S. PATENT DOCUMENTS

| 4,146,924 A * | 3/1979 | Birk ............... B25J 9/1692 318/568.13 |
| 6,278,906 B1 * | 8/2001 | Piepmeier ............ B25J 9/1607 700/245 |

(Continued)

FOREIGN PATENT DOCUMENTS

| JP | 9-239682 A | 9/1997 |
| JP | 10-194437 A | 7/1998 |

(Continued)

OTHER PUBLICATIONS

International search report for the corresponding international application No. PCT/JP026461, dated Aug. 6, 2019.
(Continued)

*Primary Examiner* — Douglas A Hess
(74) *Attorney, Agent, or Firm* — Global IP Counselors, LLP

(57) ABSTRACT

A workpiece conveying system includes a disposition component, a first imaging component, a first position sensor, a conveyor, a first removal component, and a position adjuster. A plurality of workpieces are disposable on the disposition component. The first imaging captures an image of workpieces on the disposition component. The first position sensor senses a position of a workpiece to be removed from the disposition component based on the captured image. The conveyor conveys the workpiece removed from the disposition component. The first removal component removes from the disposition component a workpiece whose position has been sensed and places the workpiece on the conveyor. The position adjuster adjusts a position of the workpiece placed on the conveyor.

12 Claims, 18 Drawing Sheets

(58) Field of Classification Search
USPC .......... 198/502.2; 700/114; 348/94; 382/152
See application file for complete search history.

(56) References Cited

U.S. PATENT DOCUMENTS

| | | | |
|---|---|---|---|
| 8,301,299 B2* | 10/2012 | Lager | G05B 19/41865 700/2 |
| 8,554,359 B2* | 10/2013 | Ichimaru | B25J 9/1687 700/214 |
| 8,559,699 B2* | 10/2013 | Boca | B25J 9/1679 382/153 |
| 9,102,055 B1 | 8/2015 | Konolige et al. | |
| 9,409,306 B2* | 8/2016 | Middleton | B26D 5/007 |
| 9,536,295 B2* | 1/2017 | Saeki | G06T 7/0004 |
| 9,579,799 B2* | 2/2017 | Parker | B25J 9/1689 |
| 9,604,363 B2* | 3/2017 | Ban | B25J 9/0093 |
| 9,741,108 B2* | 8/2017 | Ikeda | G06T 1/0007 |
| 10,286,557 B2* | 5/2019 | Ando | G06T 7/75 |
| 10,353,383 B2* | 7/2019 | Maruno | G06T 7/74 |
| 2011/0221884 A1* | 9/2011 | Araki et al. | |
| 2012/0236140 A1* | 9/2012 | Hazeyama et al. | |
| 2012/0323363 A1 | 12/2012 | Izumi et al. | |
| 2014/0121836 A1 | 5/2014 | Ban | |
| 2016/0059419 A1* | 3/2016 | Suzuki | |
| 2017/0120402 A1 | 5/2017 | Inutake | |
| 2017/0151673 A1 | 6/2017 | Kobayashi et al. | |
| 2018/0046169 A1* | 2/2018 | Shimamura et al. | |
| 2019/0015973 A1* | 1/2019 | Ooba | |
| 2019/0232492 A1* | 8/2019 | Takeuchi | |

FOREIGN PATENT DOCUMENTS

| | | |
|---|---|---|
| JP | 2000-94374 A | 4/2000 |
| JP | 2008-215955 A | 9/2008 |
| JP | 2010-240785 A | 10/2010 |
| JP | 2011-685 A | 1/2011 |
| JP | 2013-860 A | 1/2013 |
| JP | 2014-87913 A | 5/2014 |
| JP | 2017-22049 A | 1/2017 |
| JP | 2017-36113 A | 2/2017 |
| JP | 2017-80846 A | 5/2017 |
| JP | 2017-100214 A | 6/2017 |

OTHER PUBLICATIONS

Written Opinion for the the corresponding international application No. PCT/JP026461, dated Aug. 6, 2019.

* cited by examiner

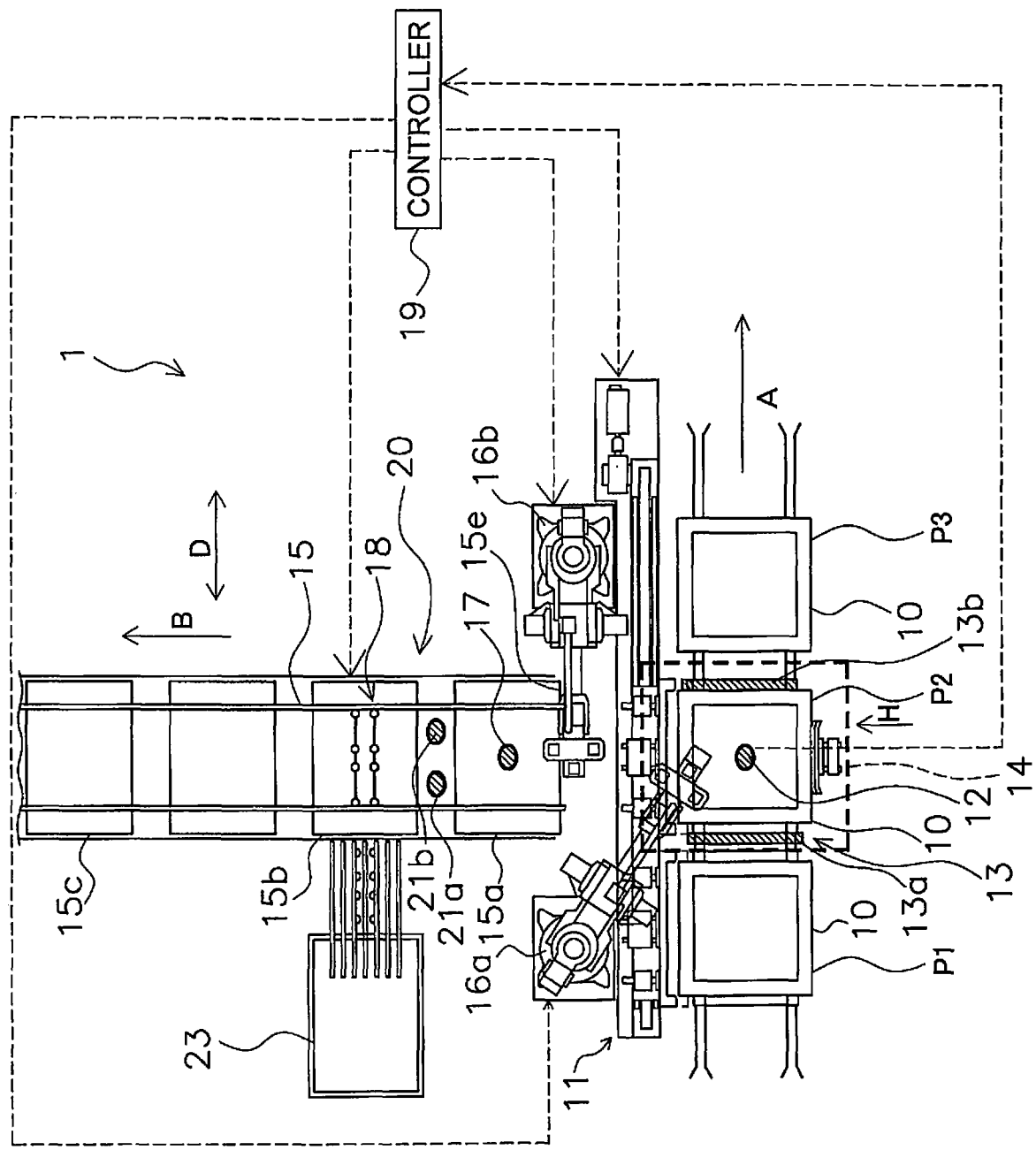
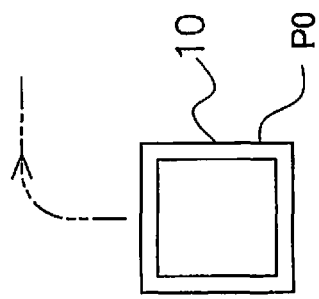
FIG. 1

WORKPIECE CONVEYING SYSTEM, AND WORKPIECE CONVEYING METHOD

BACKGROUND

Field of the Invention

The present invention relates to a workpiece conveying system and a workpiece conveying method.

Background Information

In a press line for performing press working, a destack feeder device is provided for feeding workpieces one at a time to a press device. Picking robots, for removing one workpiece from a pile of workpieces, have been used in recent years as a destack feeder device such as this (see JP-A 2000-94374, for example).

The picking robot in JP-A 2000-94374 performs three-dimensional measurement of the position of a workpiece with using a plurality of stereo images obtained by imaging with a plurality of cameras, and compares the measured value with a workpiece model that has been stored in advance, and recognizes the position and orientation of a workpiece to be removed.

SUMMARY

However, when the position and orientation of a workpiece is recognized from images captured by a plurality of cameras, it takes time to perform computation processing for a large amount of data, and it has been impossible to keep up with the need for higher production speed in recent years.

It is an object of the present invention to provide a workpiece conveying system and a workpiece conveying method with which higher speed can be achieved.

To achieve the stated object, a workpiece conveying system pertaining to one aspect of the present invention comprises a disposition component, a first imaging component, a first position sensor, a first removal component, a conveyor, and a position adjuster. A plurality of workpieces are placed on the disposition component. The first imaging component captures an image of the workpieces on the disposition component. The first position sensor senses the position of a workpiece removed from the disposition component on the basis of the captured image. The conveyor conveys the workpiece removed from the disposition component. The first removal component removes from the disposition component a workpiece whose position has been sensed and places it on the conveyor. The position adjuster adjusts the position of the workpiece placed on the conveyor.

A workpiece conveying method pertaining to another aspect of the invention comprises an imaging step, a position sensing step, a removal step, and a position adjustment step. The imaging step involves imaging a plurality of workpieces using a monoclular camera. The position sensing step involves sensing the position of a workpiece that is removed based on the captured image. The removal step involves removing from among the plurality of workpieces a workpiece whose position has been sensed and placing that workpiece on a conveyor that conveys the workpieces. The position adjustment step involves adjusting the positions of the workpieces placed on the conveyor.

The present invention provides a workpiece conveying system and a workpiece conveying method with which higher speed can be achieved.

BRIEF DESCRIPTION OF DRAWINGS

FIG. 1 is a simplified plan view of the configuration of a destack feeder system in Embodiment 1 of the present invention;

DETAILED DESCRIPTION OF EMBODIMENT(S)

Figure 2:
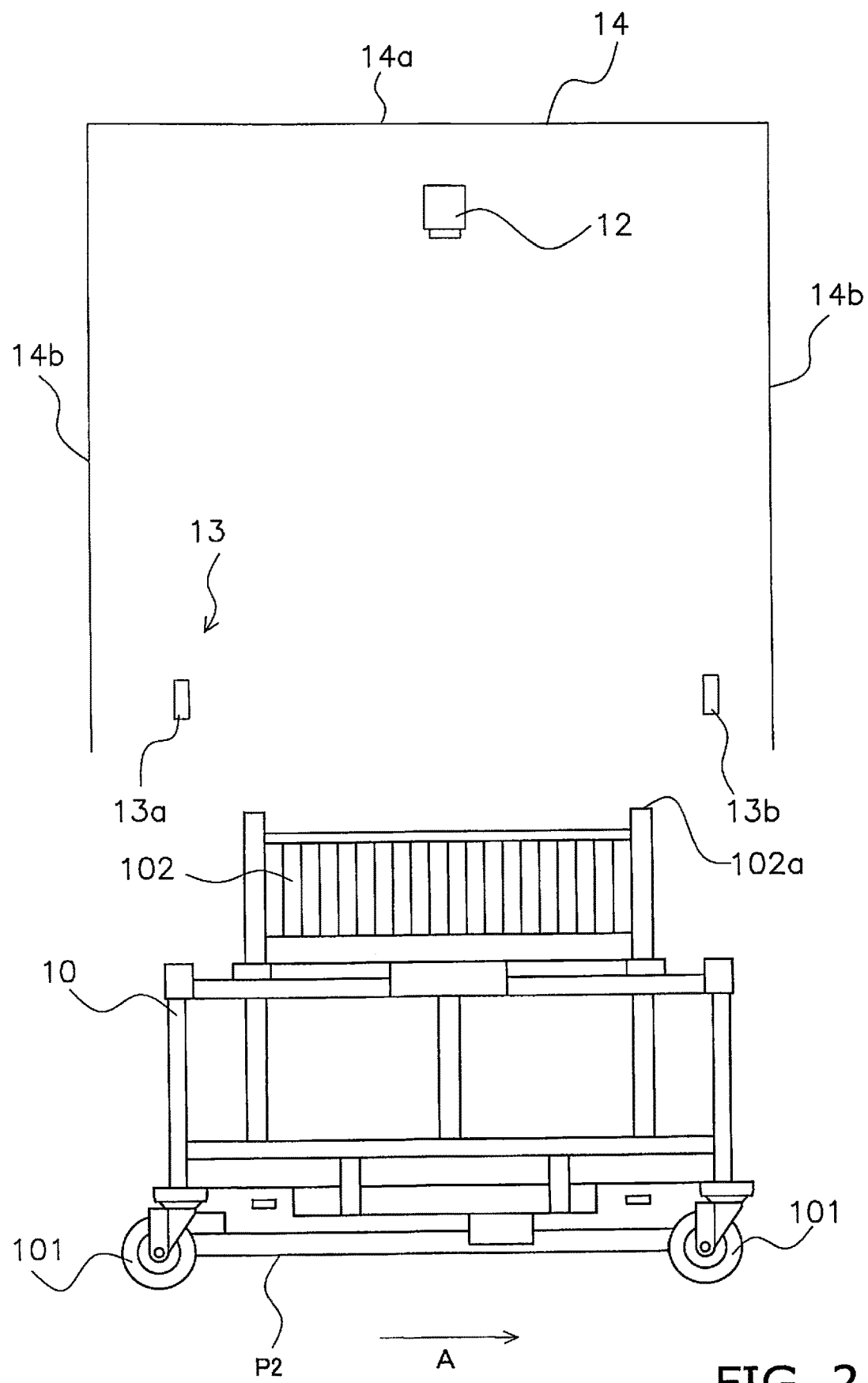
FIG. 2 is a simplified side view of a cart in a state of being disposed at the removal position in FIG. 1.

The destack feeder system 1 in an embodiment of the present invention will now be described through reference to the drawings.

1. Configuration

Overview of the Destack Feeder System

FIG. 1 is a plan view of the destack feeder system 1 in this embodiment. The destack feeder system 1 in this embodiment picks up and removes one workpiece from among a pile of workpieces and then performs position adjustment and conveys the workpiece to a press device or the like.

The destack feeder system 1 comprises a cart 10, a cart shift device 11, a monocular camera 12, an irradiation component 13, a blackout screen 14, a belt feeder 15, pickup robots 16a and 16b, a position adjuster 20, a controller 19.

The workpieces W are stacked in a pile on the cart 10. The cart shift device 11 moves the cart 10 to a removal position P2 for removing the workpieces W. The blackout screen 14 covers the cart 10 at the workpiece removal position P2. The monocular camera 12 images the workpieces W irradiated by the irradiation component 13 at the removal position P2. The controller 19 chooses a workpieces W to be removed on the basis of the captured image, and senses the position of the workpieces W. The pickup robots 16a and 16b remove the workpieces W chosen by the controller 19 and places them on the belt feeder 15. The position adjuster 20 senses positional deviation of the workpieces W placed on the belt feeder 15 from the specified position, and corrects the position of the workpieces W. In this embodiment, the workpieces W are flat members, for example. Also, the specified position is the position that is optimal for the purpose for which the workpieces W are being conveyed. For example, when press working is to be performed in the next step, the specified position is the position that is optimal for transferring the workpieces W to the press device. Also, the term "position" encompasses a position that lies in a plane (in the xy coordinates) and a position in the rotation direction. Therefore, positional deviation includes the xy coordinates and the rotation angle θ.

The various components will be described in detail below.
Cart 10

FIG. 2 is a side view of the cart 10 in a state of being disposed in the removal position P2 for removing workpieces with the pickup robots 16a and 16b. FIG. 2 is a view as seen in the arrow H direction in FIG. 1.

The cart 10 has wheels 101 at its four corners, and the cart 10 at the position P0 is conveyed to the front position (entrance position P1) of the cart shift device 11 by an AGV (automated guided vehicle). The cart 10 is then moved by the cart shift device 11 to the removal position P2 where the workpieces W are removed. The cart 10 has a bucket 102, and a plurality of workpieces are held in the bucket 102 in a bulk state (see FIG. 5 (discussed below)).

Figure 3A:
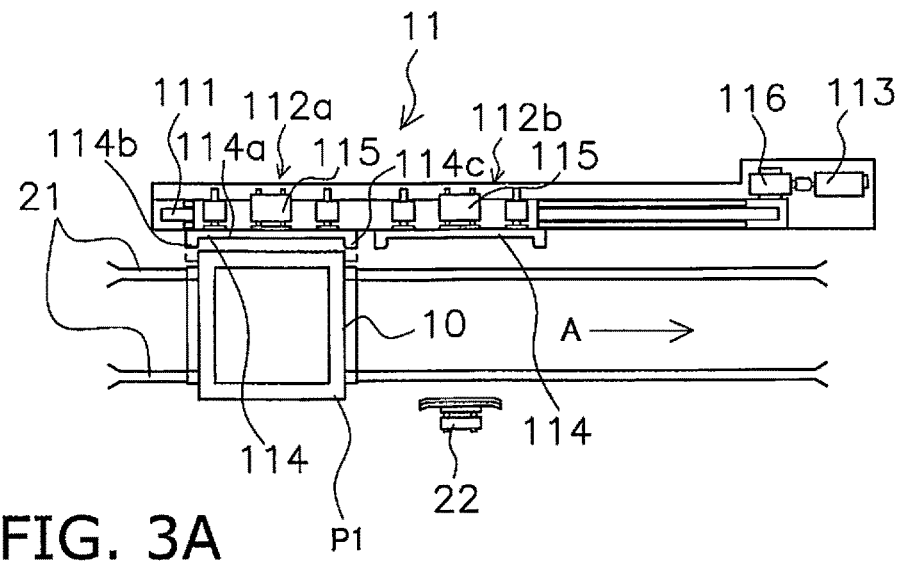
FIG. 3A is a simplified plan view of the operation of the cart shift device in FIG. 1.

FIG. 3A shows the state when the cart 10 has been conveyed by the AGV to a position in front of the cart shift device 11. The position of the cart 10 shown in FIG. 3A is the entrance position P1.

The cart shift device 11 has a timing belt 111, two clamping devices 112a and 112b, a shift servomotor 113, and a reduction gear 116.

The timing belt 111 is disposed along the movement direction of the cart 10 (see the arrow A in FIG. 1). The timing belt 111 rotates along the movement direction. The clamping devices 112a and 112b are fixed to the timing belt 111 and move along the timing belt 111 by the rotation of the timing belt 111. The shift servomotor 113 drives the timing belt 111 via the reduction gear 116. A caster guide 21 for guiding the cart 10 along the timing belt 111 is provided. The caster guide 21 has two rails, the wheels 101 of the cart 10 are fitted in between the rails, and the cart 10 is guided so as to move along the timing belt 111.

The cart 10 is conveyed by the AGV and its wheels are fitted into the caster guide 21, after which the cart 10 is guided by the caster guide 21 and moved along the caster guide 21 by the cart shift device 11. The cart 10 is moved (in the direction of the arrow A) by the cart shift device 11 to the entrance position P1, the removal position P2, and the exit position P3 shown in FIG. 1, in that order.

The two clamping devices 112a and 112b are disposed alongside the timing belt 111, and each of the clamping devices 112a and 112b has a clamp portion 114 and a clamp cylinder 115. The clamping device 112a is disposed upstream from the clamping device 112b, using movement direction A of the cart 10 as a reference. The clamp portion 114 has a parallel portion 114a that is parallel to the timing belt 111, and end portions 114b and 114c extending from the ends of the parallel portion 114a toward the side where the cart 10 moves. The distal end of the rod of the clamp cylinder 115 is connected to the clamp portion 114, and the cylinder of the clamp cylinder 115 is fixed to the timing belt 111.

Figure 3B:
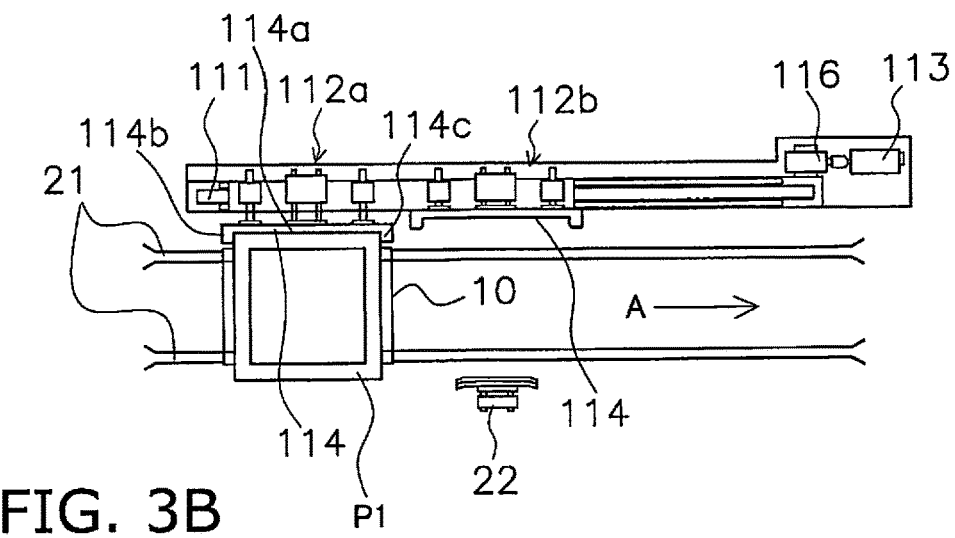
FIG. 3B is a simplified plan view of the operation of the cart shift device in FIG. 1.
Figure 3C:
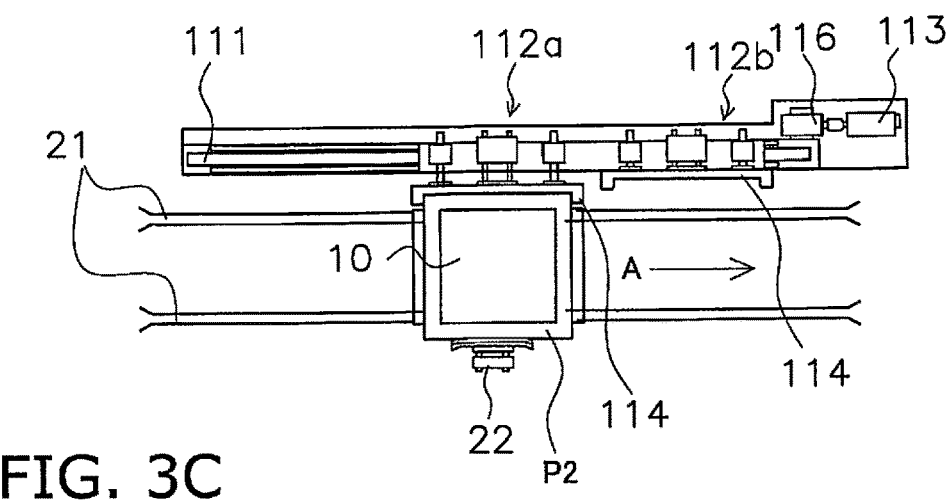
FIG. 3C is a simplified plan view of the operation of the cart shift device in FIG. 1.
Figure 4A:
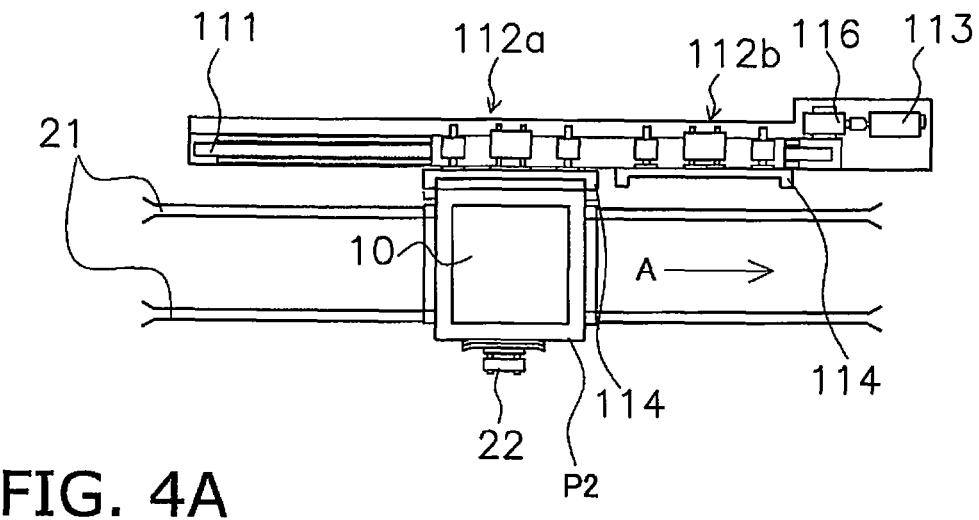
FIG. 4A is a simplified plan view of the operation of the cart shift device in FIG. 1.
Figure 4B:
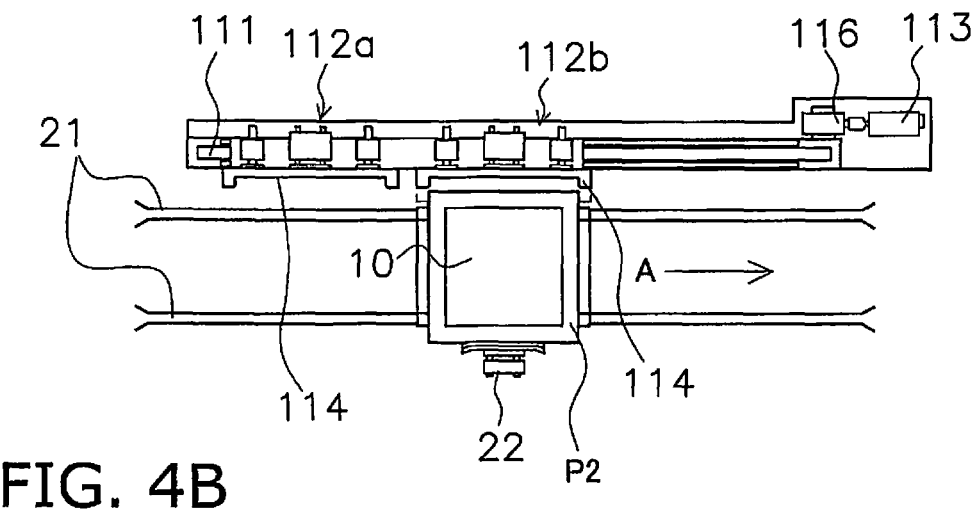
FIG. 4B is a simplified plan view of the operation of the cart shift device in FIG. 1.
Figure 4C:
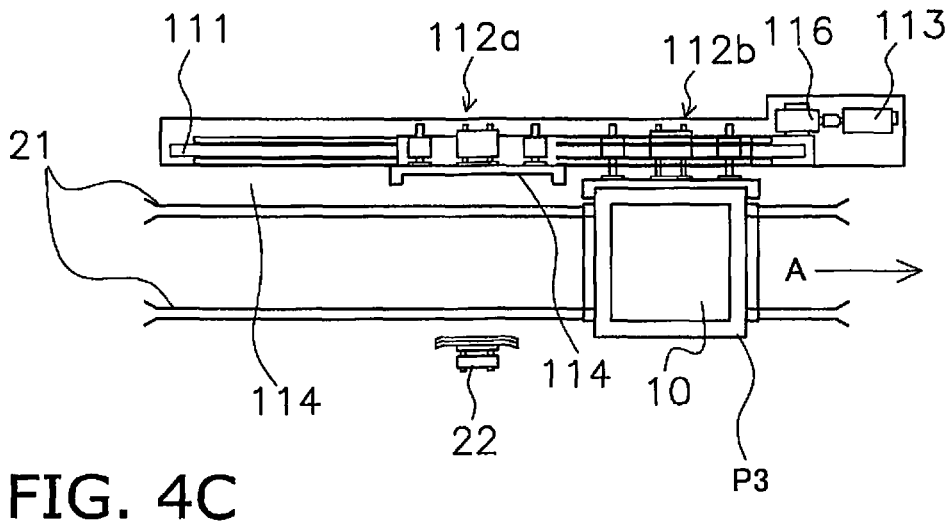
FIG. 4C is a simplified plan view of the operation of the cart shift device in FIG. 1.

When the clamp cylinder 115 extends from the state shown in FIG. 3A, the cart 10 is clamped by the end portions 114b and 114c as shown in FIG. 3B. When the shift servomotor 113 is driven in this state, the cart 10 moves in the direction of the arrow A along the timing belt 111 and moves to the removal position P2 as shown in FIG. 3C. At the removal position P2, the position of the cart 10 during workpiece removal is fixed by the clamping device 22, which is disposed opposite the timing belt 111. When removal of the workpieces is completed at the removal position P2, as shown in FIG. 4A, the clamping device 112a contracts and moves away from the cart 10. Next, as shown in FIG. 4B, the drive of the shift servomotor 113 causes the clamping devices 112a and 112b to move toward the opposite side in the movement direction A of the cart 10. Then, the clamping device 112b expands and the cart 10 disposed at the removal position P2 is clamped by the clamping device 112b. The shift servomotor 113 is then driven to move the clamping devices 112a and 112b in the movement direction of the cart 10, and the cart 10 moves from the removal position P2 to the exit position P3 as shown in FIG. 4C. The cart 10 disposed at the exit position P3 is conveyed by the AGV after the clamping device 112 has contracted.
Monocular Camera 12, Irradiation Component 13, and Blackout Screen 14

As shown in FIGS. 1 and 2, the monocular camera 12 is disposed above the removal position P2. More precisely, the monocular camera 12 is disposed above the cart 10 so as to be able to image the inside of the bucket 102 of the cart 10 disposed at the removal position P2.

The irradiation component 13 has two red LEDs 13a and 13b. The red LEDs 13a and 13b are disposed flanking the monocular camera 12 in the arrow A direction. The red LEDs 13a and 13b are disposed lower than the monocular camera 12. These red LEDs 13a and 13b irradiate the pile of workpieces W in the bucket 102 with light. The monocular camera 12 images the pile of workpieces W in the bucket 102 irradiated with the light.

The blackout screen 14 is disposed so as to cover the monocular camera 12 and the two red LEDs 13a and 13b, and prevents outside light from entering the pallet 110. The incursion of external light can be prevented better by providing the blackout screen 14 as close as possible to the upper end 102a of the bucket 102. In FIG. 2, only the side face portion 14b hanging down from the left and right ends from the ceiling portion 14a is shown in FIG. 2, but the side face portions 14b hanging down from the back side and the front side ends of the ceiling portion 14a in FIG. 2 are also provided (not shown).

Figure 5:
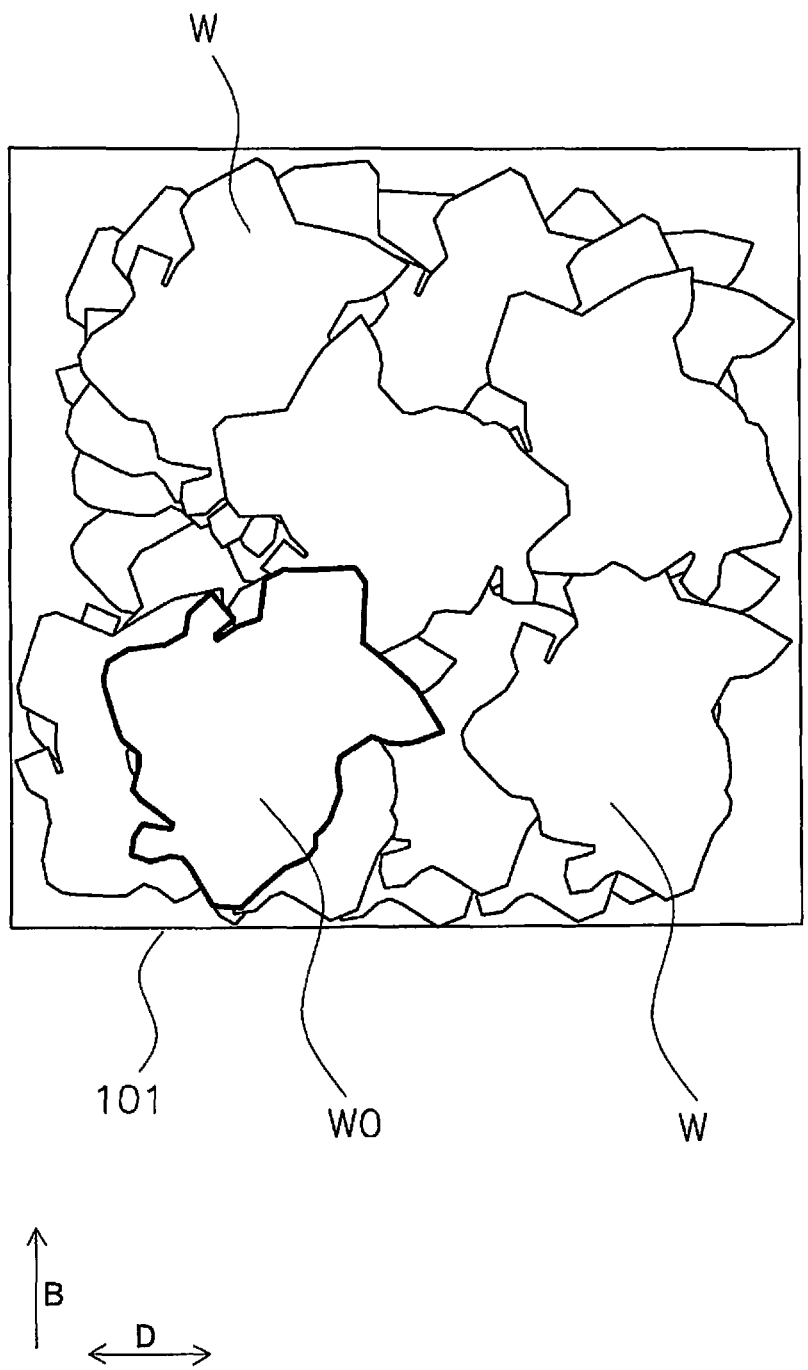
FIG. 5 is a diagram of an image captured by the monocular camera in FIG. 1.

FIG. 5 is a diagram showing an image captured by the monocular camera 12. As shown in FIG. 5, workpieces W of the same shape that are piled up in the bucket 102 are imaged. The workpieces W that are to be picked up are determined according to the intensity, etc., of the reflected light produced by the red LEDs 13*a* and 13*b* in the captured image. Also, the sharpness of the edges, the position (disposed as high as possible), and so forth may be taken into consideration, and not just the intensity of the reflected light.

Belt Feeder 15

The belt feeder 15 conveys the workpieces W removed from the bucket 102 of the cart 10. The upstream end 15*e* of the belt feeder 15 is disposed adjacent to the removal position P2 of the cart 10. In this embodiment, the belt feeder 15 is disposed such that its conveyance direction B is substantially perpendicular to the movement direction A of the cart 10.

The belt feeder 15 has a built-in magnet provided along the conveyance direction B, and the workpieces W are held on the belt feeder 15 by magnetic force.

The belt feeder 15 is provided with an imaging position 15*a*, a correction position 15*b*, and a transfer position 15*c*, from the end 15*e* toward the downstream side in the conveyance direction B. A monocular camera 17 is disposed above the imaging position 15*a*, and the monocular camera 17 images the workpieces W which is removed from the bucket 102 by the pickup robots 16*a* and 16*b*. A position corrector 18 is provided above the correction position 15*b*, and the position of the workpieces W on the belt feeder 15 is corrected based on the image captured by the monocular camera 17. At the transfer position 15*c*, the workpieces W are transferred to the next step (such as a press working step).

Pickup Robots 16*a* and 16*b*

Figure 6:
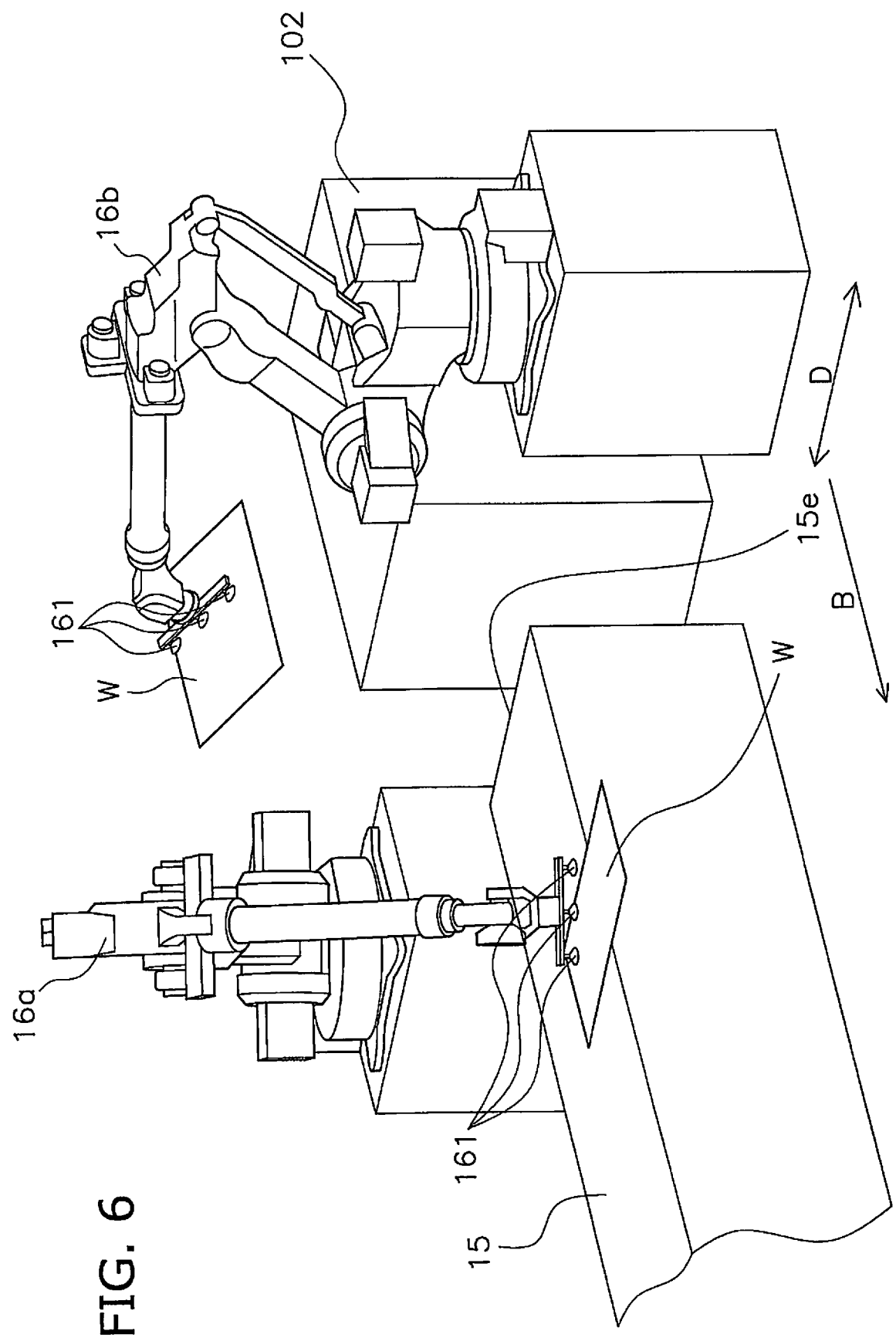
FIG. 6 is an oblique view of the pickup robot in FIG. 1.

FIG. 6 is an oblique view of the pickup robots 16*a* and 16*b*.

The pickup robots 16*a* and 16*b* remove the workpieces W from the bucket 102 of the cart 10. The pickup robots 16*a* and 16*b* are disposed opposite each other in the width direction D of the belt feeder 15 (a direction perpendicular to the conveyance direction B) so as to flank the upstream end 15*e* of the belt feeder 15.

The pickup robots 16*a* and 16*b* are articulated robots, and have a plurality of suction cups 161 at their distal ends. A workpiece W is chucked by the suction cups 161 and removed from the bucket 102.

Position Adjuster 20

The position adjuster 20 has the monocular camera 17 and the position corrector 18. The monocular camera 17 images the workpieces W placed on the belt feeder 15. The controller 19 senses positional deviation of the workpieces W based on the captured image. The position corrector 18 corrects the position of the workpieces W based on the sensed positional deviation.

Monocular Camera 17

The monocular camera 17 is disposed above the imaging position 15*a* of the belt feeder 15. The monocular camera 17 images the workpieces W that have been removed from the bucket 102 and placed on the belt feeder 15, from above. This allows positional deviation from the specified position of the workpieces W on the belt feeder 15 to be sensed.

Here, "positional deviation" is the positional deviation from a specific position that is preset when the workpieces W are placed on the belt feeder 15 by the pickup robots 16*a* and 16*b*. More precisely, "positional deviation" is the positional deviation in the conveyance direction B, the positional deviation in the width direction D, and the positional deviation in the rotation direction around the vertical direction with respect to the upper face 15*s* of the belt feeder 15.

Position Corrector 18

Figure 7:
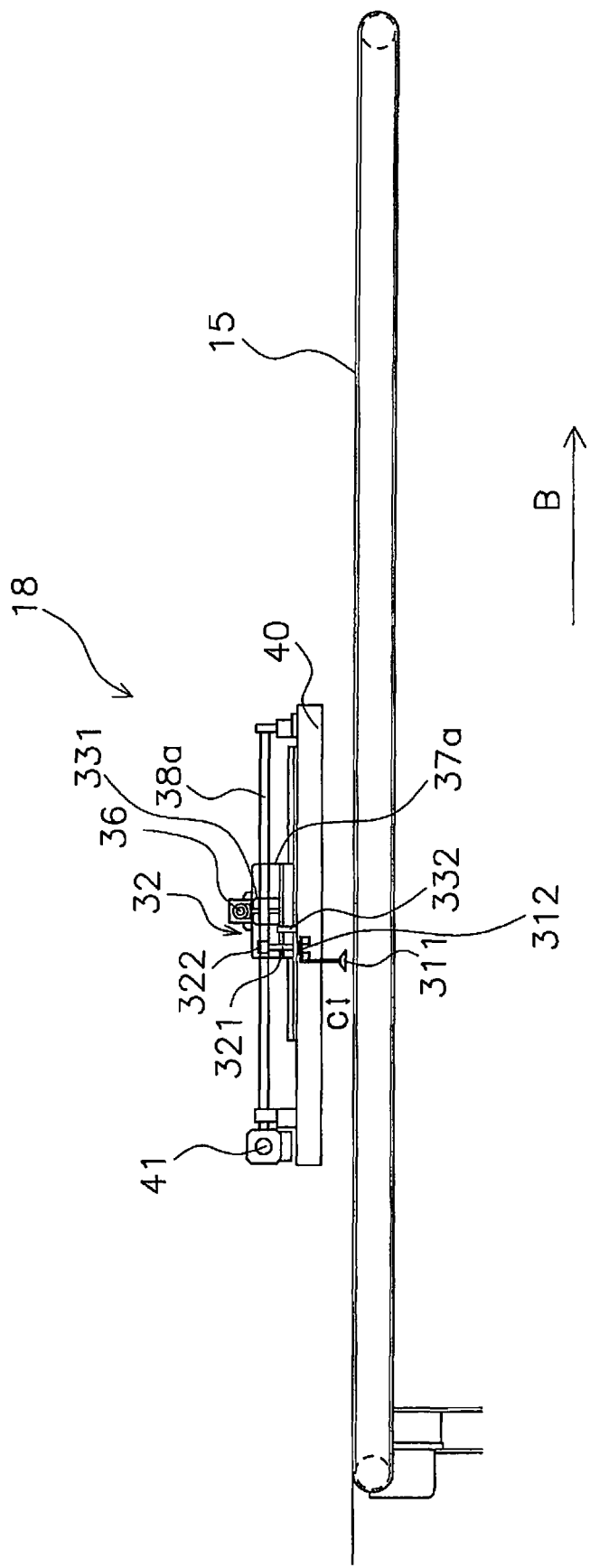
FIG. 7 is a side view of the position corrector in FIG. 1.
Figure 8:
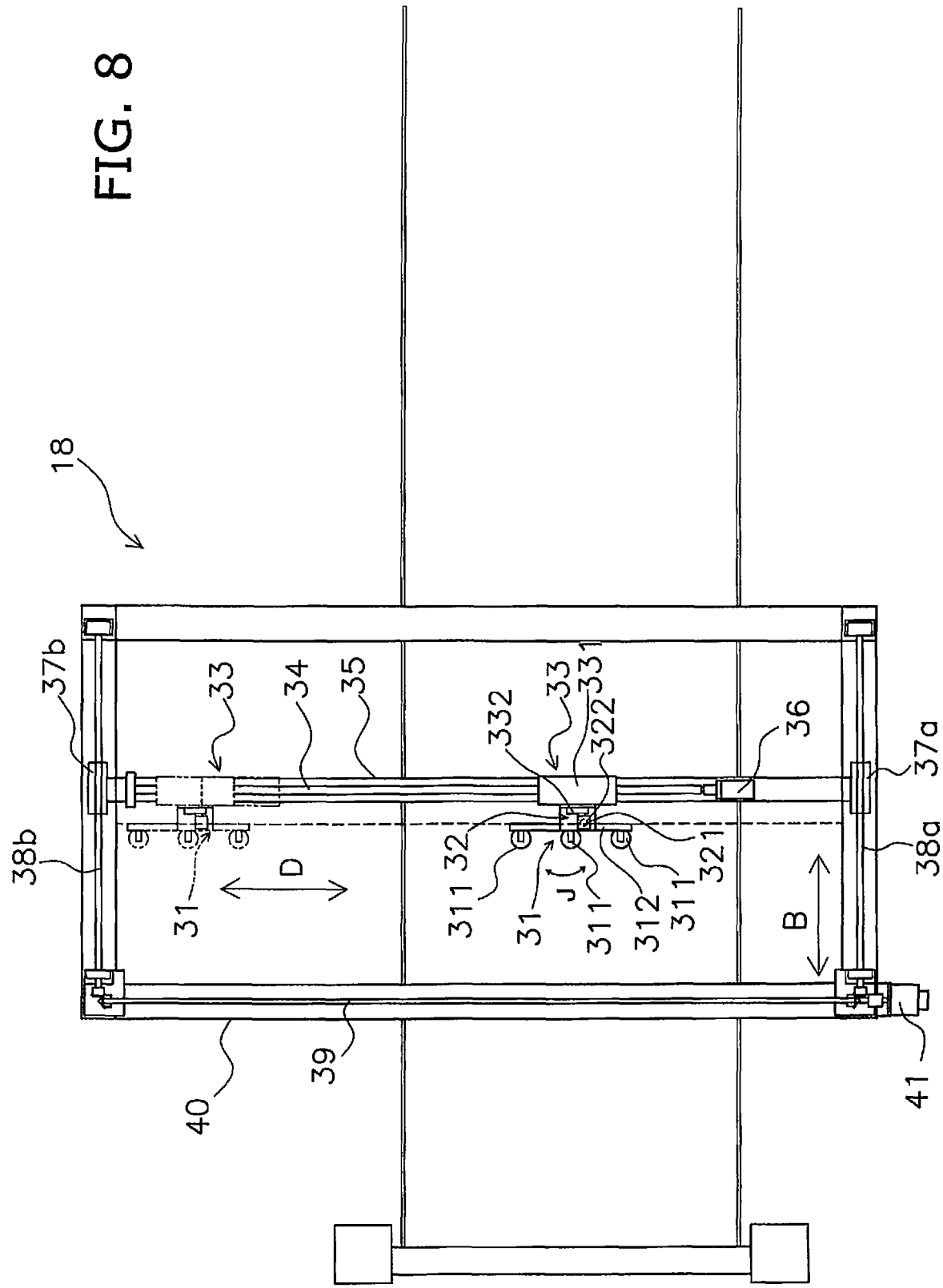
FIG. 8 is a plan view of the position corrector in FIG. 1.

FIG. 7 is a side view of the position corrector 18. FIG. 8 is a plan view of the configuration of the position corrector 18.

The position corrector 18 is disposed above the belt feeder 15, and as shown in FIG. 8, has a suction component 31, a rotation component 32, a suction holding component 33, a width direction ball screw 34, a support frame 35, a width direction servomotor 36, movement components 37*a* and 37*b*, conveyance direction ball screws 38*a* and 38*b*, a transmission shaft 39, and a conveyance direction servomotor 41.

As shown in FIG. 8, the suction component 31 has a plurality of suction nozzles 311 and a connecting portion 312 that connects the suction nozzles 311. The suction component 31 sucks in the air inside the suction nozzles 311 to chuck a workpiece W.

The rotation component 32 rotates the suction component 31 in a horizontal plane. As shown in FIG. 7, the rotation component 32 has a rotating shaft 321 and a shaft servomotor 322. The rotating shaft 321 is disposed in the vertical direction (C direction). The lower end of the rotating shaft 321 is fixed to the connecting portion 312. The shaft servomotor 322 is connected to the upper end of the rotating shaft 321, the rotating shaft 321 is rotated around the vertical direction by the rotational drive of the shaft servomotor 322, and the suction component 31 also rotates (see the arrow J in FIG. 8).

The suction holding component 33 has a suction holding component main body 331 and an air cylinder 332 fixed to the suction holding component main body 331. The lower end of the air cylinder 332 is fixed to the connecting portion 312, and as the air cylinder 332 extends, the suction component 31 moves downward and can chuck the workpiece W. When the air cylinder 332 contracts, the suction component 31 moves upward (see the arrow C in FIG. 3) and moves away from the workpiece W. A through-hole is formed in the holding component main body 331 along the width direction D perpendicular to the conveyance direction B, and the inner peripheral face of the through-hole is threaded.

The width direction ball screw 34 is disposed above the belt feeder 15 along the width direction D. The width direction ball screw 34 is inserted into a through-hole formed in the holding component main body 331 and threaded into the threads formed on the inner peripheral face of the through-hole.

The support frame 35 rotatably supports the width direction ball screw 34. The width direction servomotor 36 is fixed to the support frame 35 and is connected to the width direction ball screw 34 via a reduction gear or the like. The width direction ball screw 34 is rotated by the rotational drive of the width direction servomotor 36, and the suction holding component 33 and the suction component 31 move in the width direction D. In FIG. 8, the suction component 31, the rotation component 32, and the suction holding component 33 that have moved in the left direction toward the downstream side in the conveyance direction B are indicated by two-dot chain lines.

The movement component 37*a* is fixed to one end of the support frame 35 in the width direction D, and the movement component 37*b* is fixed to the other end of the support frame 35 in the width direction D. A through-hole is formed in each of the movement components 37*a* and 37*b* in the conveyance direction B, and the inner peripheral face of the through-hole is threaded.

The conveyance direction ball screws 38*a* and 38*b* are disposed above the belt feeder 15 along the conveyance direction B. The conveyance direction ball screw 38a is inserted into a through-hole formed in the movement component 37a and threaded into the threads of the inner peripheral face of the through-hole. The conveyance direction ball screw 38b is inserted into a through-hole formed in the movement component 37b and threaded into the threads of the inner peripheral face of the through-hole.

The lengthwise direction of the transmission shaft 39 is disposed along the width direction D. The transmission shaft 39 is connected by a gear or the like to the downstream ends in the conveyance direction B of the conveyance direction ball screws 38a and 38b.

A support frame 40 rotatably supports the conveyance direction ball screw 38a, the conveyance direction ball screw 38b, and the transmission shaft 39. The support frame 40 is held at a specific height above the belt feeder 15 by a frame (not shown).

The conveyance direction servomotor 41 is connected to the transmission shaft 39 via a reduction gear or the like. The conveyance direction servomotor 41 is fixed to the support frame 40. The rotational drive of the conveyance direction servomotor 41 rotates the transmission shaft 39. The rotation of the transmission shaft 39 is transmitted to the conveyance direction ball screws 38a and 38b, causing the conveyance direction ball screws 38a and 38b to rotate. The rotation of the conveyance direction ball screws 38a and 38b cause the movement components 37a and 37b to move to the upstream side or the downstream side in the conveyance direction B. Consequently, the width direction ball screw 34 fixed to the movement components 37a and 37b, the suction holding component 33 disposed on the width direction ball screw 34, and the suction component 31 held by the suction holding component 33 also move to the upstream side or the downstream side in the conveyance direction B.

As described above, a workpiece W placed on the belt feeder 15 is held in place by the suction component 31, and the suction component 31 is moved to the upstream side or the downstream side in the conveyance direction Y, to the left side or the right side in the width direction D, and in the J direction so as to be in a specific position, after which it is placed on the belt feeder 15, allowing the workpiece W to be placed in a specific predetermined position.

Controller 19

Figure 9:
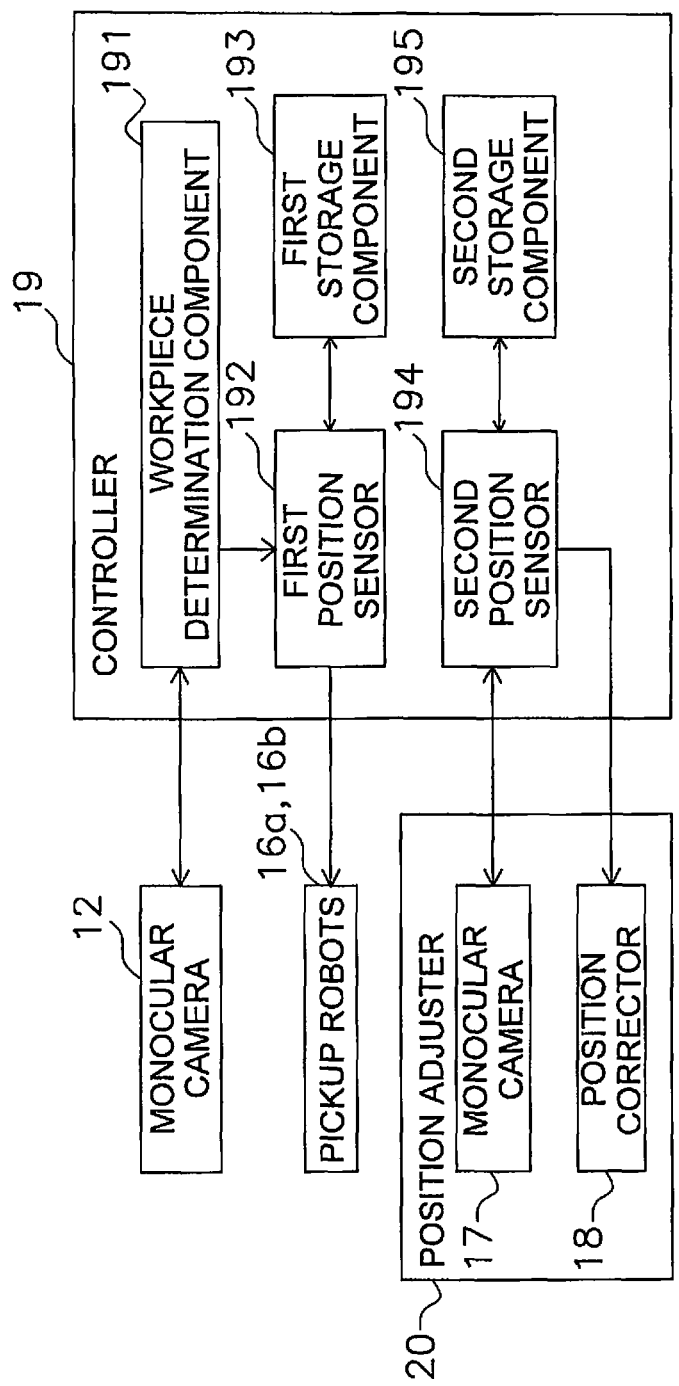
FIG. 9 is a block diagram of the configuration of the controller in FIG. 1.

FIG. 9 is a diagram showing the configuration of the controller 19. The controller 19 has a workpiece determination component 191, a first position sensor 192, a first storage component 193, a second position sensor 194, and a second storage component 195.

The workpiece determination component 191 determines the workpiece to be removed by the pickup robots 16a and 16b on the basis of the image captured by the monocular camera 12. The workpiece determination component 191 may convert the intensity and the position of reflected light into points or the like, and choose a workpiece having a high point count as the workpiece W to be removed. The higher the intensity, the easier it is to recognize the position, so the points may be increased, and the higher up a workpiece is located, the easier it is to remove, so the points may be increased. For example, in FIG. 5, the workpiece W0 is chosen as the workpiece to be removed. The workpiece to be removed may be chosen using just high reflection intensity, or the workpiece W with the highest intensity of reflected light from the red LEDs 13a and 13b may be chosen as the workpiece W to be removed. Furthermore, the sharpness of the outline of a workpiece W or the like may be utilized.

Figure 10A:
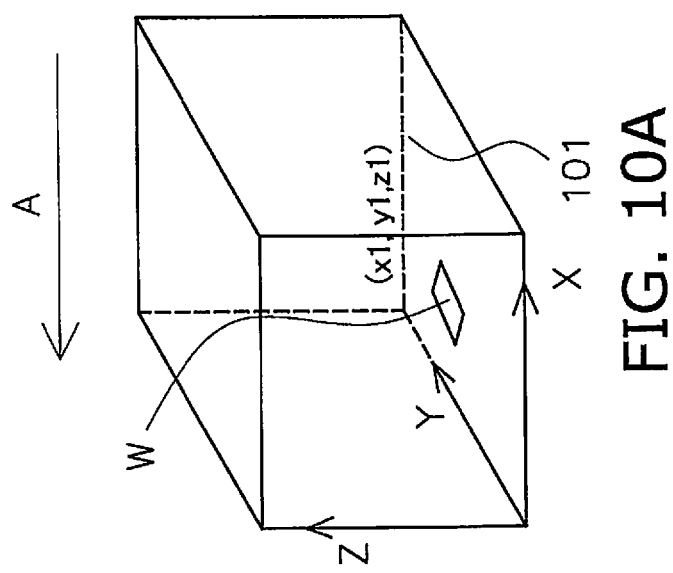
FIG. 10A is a diagram illustrating the position of a workpiece.
Figure 10B:
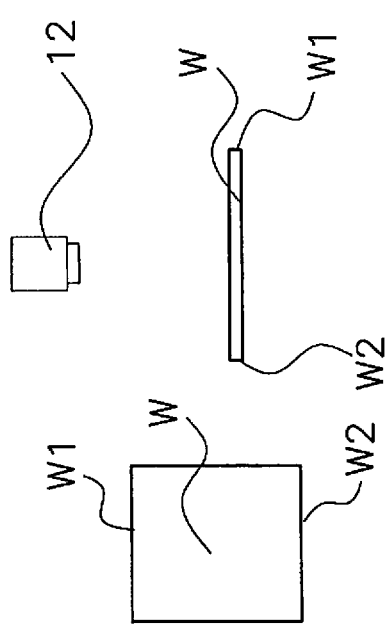
FIG. 10B is a diagram illustrating the position of a workpiece.
Figure 10C:
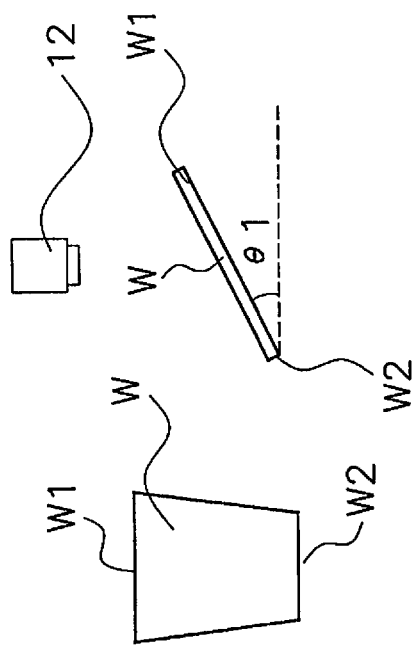
FIG. 10C is a diagram illustrating the position of a workpiece.

The first position sensor 192 senses the position of the workpiece W chosen to be removed on the basis of the shape of the workpiece W stored in the first storage component 193. FIGS. 10A, 10B, and 10C are diagrams illustrating the position of the workpiece W.

As shown in FIG. 10A, the width direction of the bucket 102 is the X axis, the depth direction is the Y axis, and the height direction is the Z axis. The first position sensor 192 senses the XYZ coordinates (x1, y1, z1) for a plurality of points in the outline of the workpiece W chosen to be removed, from the shape of the workpiece W stored in the first storage component 193.

The first position sensor 192 also senses the inclination θ of the workpiece W. For example, if the workpiece W is a flat, rectangular member, as shown in FIG. 10B, when the workpiece W is horizontally disposed, the lengths of the opposing first side W1 and second side W2 are equal in the image captured by the monocular camera 12. On the other hand, as shown in FIG. 10C, when the workpiece W is inclined so that the position of the first side W1 is higher than the second side W2, in the image captured by the monocular camera 12, the length of the first side W1 will show up as being longer than the second side W2. The first position sensor 192 can calculate the inclination angle θ1 of the workpiece W from the change in the lengths of the first side W1 and the second side W2 in the captured image with respect to the first side W1 and the second side W2 of the workpiece W stored in the first storage component 193. In this way, the inclination angle θ1 is found with respect to the X axis, the Y axis, and the Z axis.

Figure 11B:
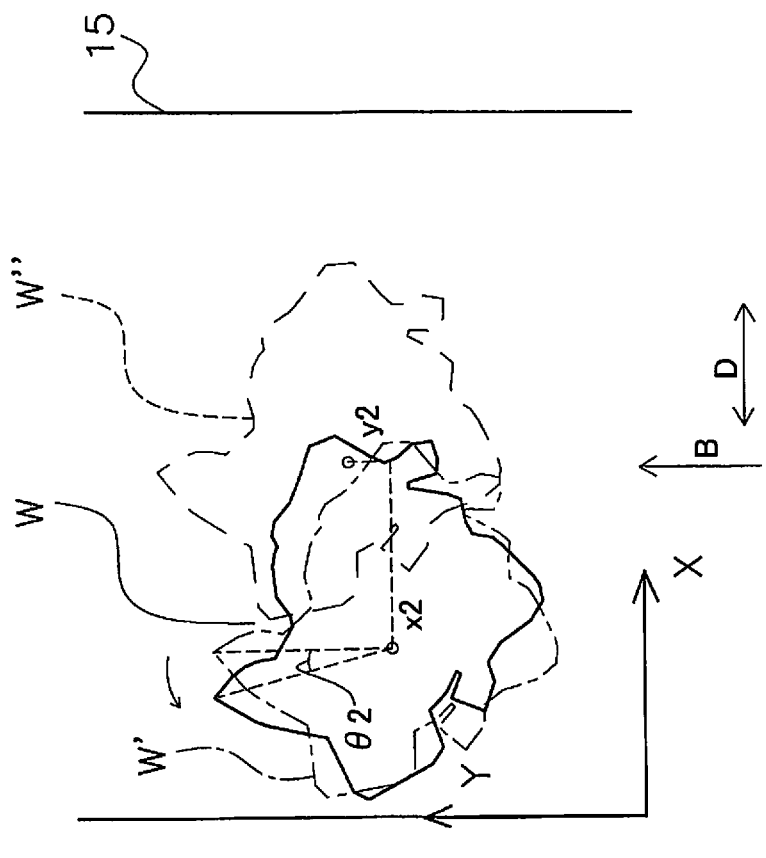
FIG. 11B is a diagram of an image captured by the monocular camera in FIG. 1.
Figure 11A:
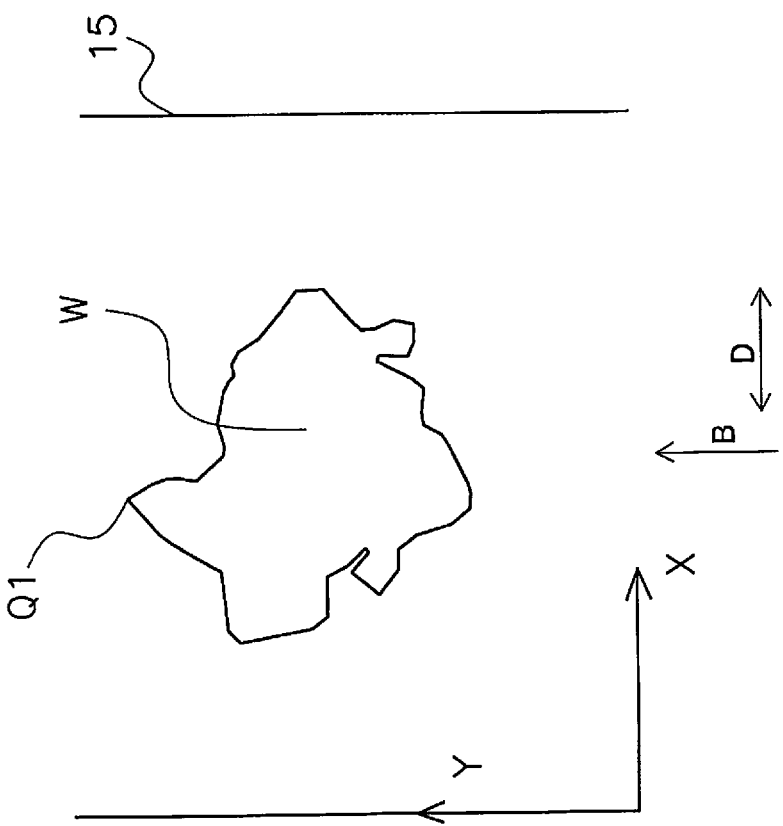
FIG. 11A is a diagram showing an example of a workpiece W stored in the second storage component in FIG. 9.

Also, the rotation angle of the workpiece W in the bucket 102 with respect to the specific position expected to be disposed on the belt feeder 15 can also be sensed from the plurality of XYZ coordinates. FIG. 11A is a diagram showing a state in which the workpiece W is disposed at a specific position on the belt feeder 15.

The first position sensor 192 thus senses the XYZ coordinates and the inclination θ of the workpiece W chosen to be removed, and transmits them to the pickup robots 16a and 16b. The pickup robots 16a and 16b pick up the workpiece W on the basis of the sensed points and inclination, and place the workpiece W on the belt feeder 15 to match the orientation in FIG. 11A on the basis of the rotation angle from the specific position (for example, so that the point Q1 faces downstream in the conveyance direction B).

The second position sensor 194 senses the position of the workpiece W on the belt feeder 15 on the basis of the image captured by the monocular camera 17. FIG. 11A shows the state when the workpiece W is disposed at a specific position on the belt feeder 15. The specific position shown in FIG. 11A is stored in the second storage component 195. FIG. 11B shows an example of an image of the workpiece W captured by the monocular camera 17. The state shown in FIG. 11A is one in which the workpiece W is disposed at a specified, predetermined position. If we let the width direction be the X axis, the conveyance direction be the Y axis, and the rotation direction be the θ position, as shown in FIG. 11B, the second position sensor 194 can sense the position of the workpiece W from the image captured by the monocular camera 17, and sense positional deviation from the specified position. More specifically, the X coordinate and the Y coordinate of a plurality of points around the outline of the workpiece W disposed on the belt feeder 15 are sensed, and these are compared with the X coordinate and the Y coordinate of the plurality of points around the outline of the workpiece W at the specified position shown in FIG. 11A, which makes it possible to sense the positional deviation (x2, y2, θ2) from the specified position.

In FIG. 11B, the workpiece at the specified position is shown as W". As shown in FIG. 11B, it can be seen that there is positional deviation in the imaged workpiece W, by x2 in the X coordinate direction, y2 in the Y coordinate direction, and the angle θ2 in the rotational direction. A workpiece that has moved by x2 and y2 from the specified position is indicated as W', and the imaged workpiece W is rotated counterclockwise by 0° from the workpiece W'. The second position sensor 194 transmits the sensed positional deviation (x2, y2, θ2) to the position corrector 18.

Some or all of the functions of the controller 19 can be executed using a CPU (central processing unit), a processor, or the like.

As shown in FIG. 1, DB (double blank) sensors 21a and 21ba are provided between the position corrector 18 and the monocular camera 17 for sensing a double blank. The DB sensors 21a and 21b detect that two or more workpieces W conveyed by the belt feeder 15 overlap each other. The DB sensors 21a and 21b are disposed aligned in the width direction D, and are sensors for sensing the thickness of a workpiece W and transmitting the sensed value to the controller 19. When the sensed value is greater than a specified value, the controller 19 concludes that there is a double blank and discharges the workpiece W from the belt feeder 15 to a discharge area 23.

2. Operation

Next, the operation of the destack feeder system 1 in an embodiment of the present invention will be described, and the workpiece conveying method of the present invention will also be described.

Figure 12:
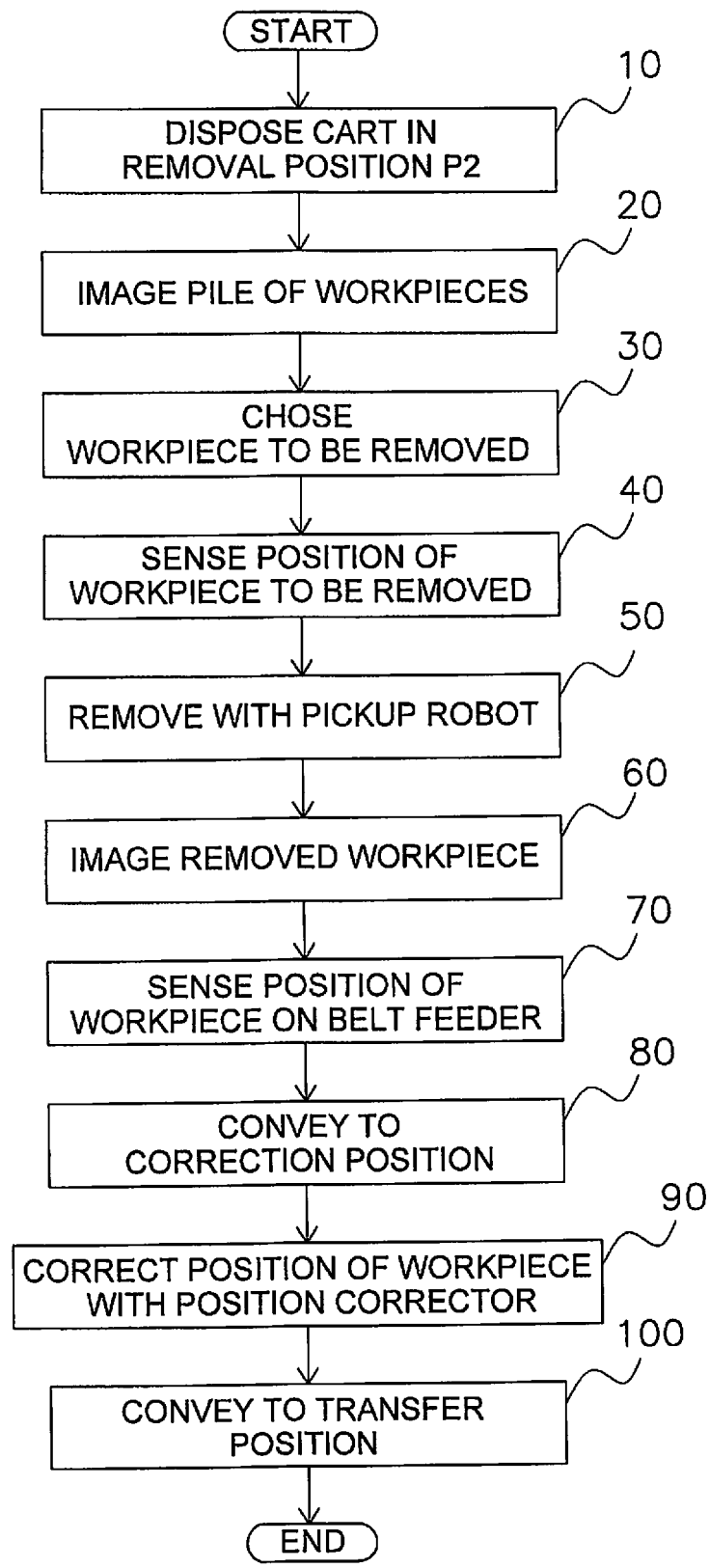
FIG. 12 is a flowchart of the operation of the destack feeder system in FIG. 1.

FIG. 12 is a flowchart of the operation of the destack feeder system 1 in this embodiment.

First, in step S10, the cart 10 on which a plurality of workpieces W are piled up is disposed at the removal position P2 (see FIG. 1).

Next, in step S20, the monocular camera 12 images the pile of workpieces W in a state in which they are irradiated with light from the red LEDs 13a and 13b, based on a command from the controller 19.

Next, in step S30, the workpiece determination component 191 determines the workpiece W to be removed by the pickup robots 16a and 16b on the basis of the captured image. The intensity of the reflected light, position, and so forth are converted into points, and a workpiece having a high point count is chosen as a workpiece to be removed.

Next, in step S40, the first position sensor 192 senses a plurality of positions (x1, y1, z1) around the outline of the workpiece W chosen to be removed and its inclination (θ1), and transmits the position information to the pickup robot 16a or 16b.

Next, in step S50, the pickup robot to which the positional information about the workpiece was transmitted (among the pickup robots 16a and 16b) removes the workpiece W chosen on the basis of the position information, and places it at the imaging position 15a of the belt feeder 15.

Next, in step S60, the monocular camera 17 images the workpiece W placed at the imaging position 15a based on an instruction from the controller 19, and transmits the image information to the controller 19.

Next, in step S70, the second position sensor 194 compares the image stored in the second storage component 195 (an image in which the workpiece W is disposed in the specified position) with the image transmitted from the monocular camera 17, and senses the positional deviation (x2, y2, θ2) of the position of the imaged workpiece W from the specified position of the imaged workpiece W. The second position sensor 194 transmits the positional deviation information to the position corrector 18.

Next, in step S80, the workpiece W is conveyed to the correction position 15b by the belt feeder 15.

Next, in step S90, the position corrector 18 corrects the position of the workpiece W so as to be at the specified position based on the positional deviation information.

Next, in step S100, the workpiece W is conveyed to the transfer position 15c by the belt feeder 15.

As described above, the position of the piled up workpieces W is approximated (such as at an error of ±10 mm) to the extent that the workpieces can be removed by the pickup robots 16a and 16b by using the image captured by the monocular camera 12, and this allows the processing speed to be raised. Also, the position corrector 18 uses the image captured by the monocular camera 17 to correct the positional deviation of the removed workpiece W, which allows the position of the workpiece W to be precisely adjusted.

Consequently, even with a press device requiring 25 spm, for example, the destack feeder system 1 of this embodiment can convey the workpieces W to meet that need.

Embodiment 2

The destack feeder system 2 in Embodiment 2 of the present invention will now be described. Unlike the destack feeder system 1 of Embodiment 1, the destack feeder system 2 of Embodiment 2 does not comprise the monocular camera 17 or the position corrector 18, and comprises a position adjuster 50 instead. In the following description of Embodiment 2, the description will focus on what is different from Embodiment 1. In Embodiment 2, those components that are same as in Embodiment 1 will be numbered the same.

Figure 13:
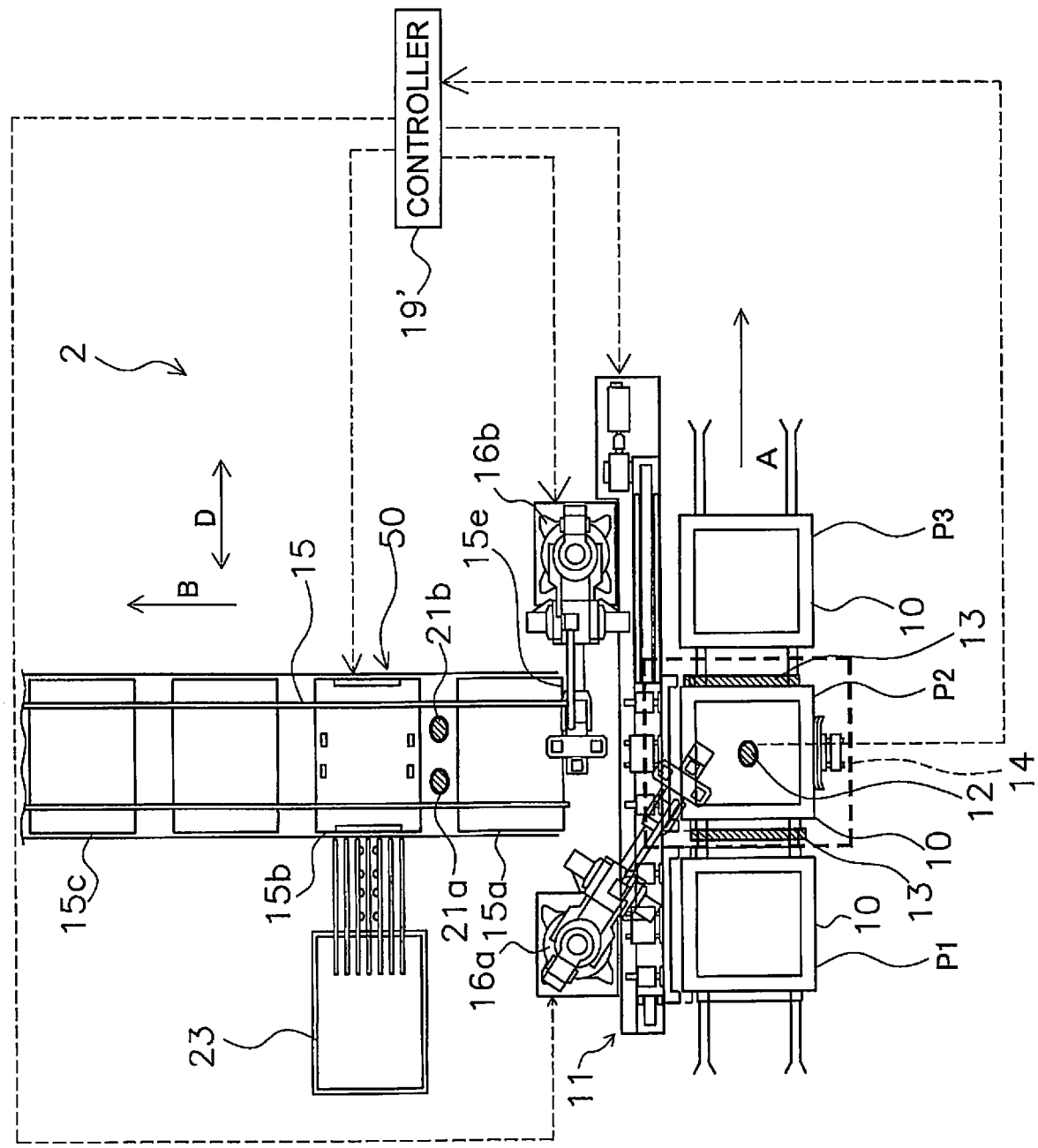
FIG. 13 is a simplified plan view of the configuration of the destack feeder system in Embodiment 2 of the present invention.

FIG. 13 is a plan view of the configuration of the destack feeder system 2 in Embodiment 2. As shown in the drawing, the destack feeder system 2 in Embodiment 2 differs from the destack feeder system 1 in Embodiment 1 in that it is not equipped with the monocular camera 17 or the position corrector 18, and is equipped with the position adjuster 50.

The position adjuster 50 is provided to the belt feeder 15, and is a centering device that mechanically moves the conveyed workpiece W to a specified position (such as a center position in the width direction D).

Figure 14A:
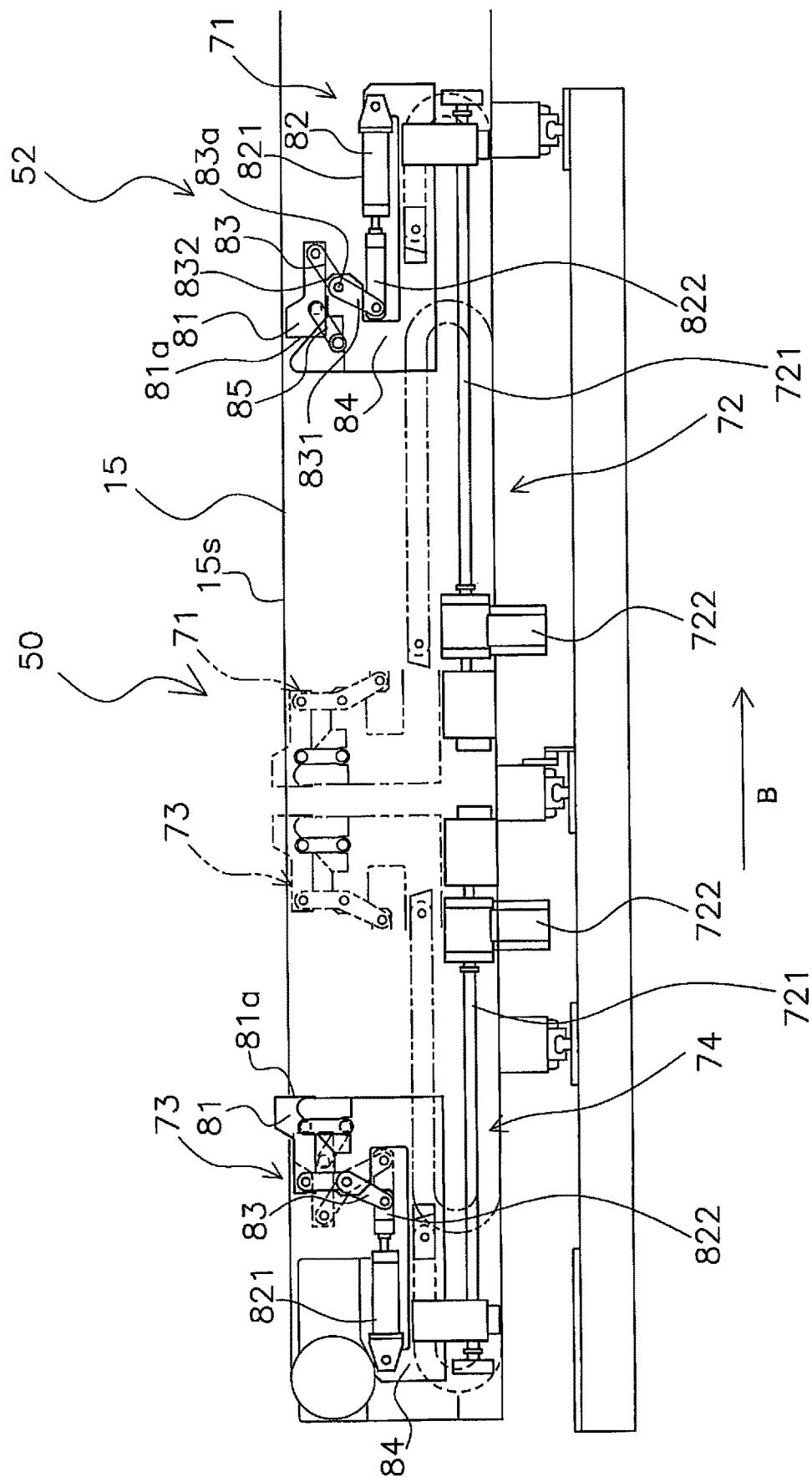
FIG. 14A is a side view of the position adjuster in FIG. 13.
Figure 14B:
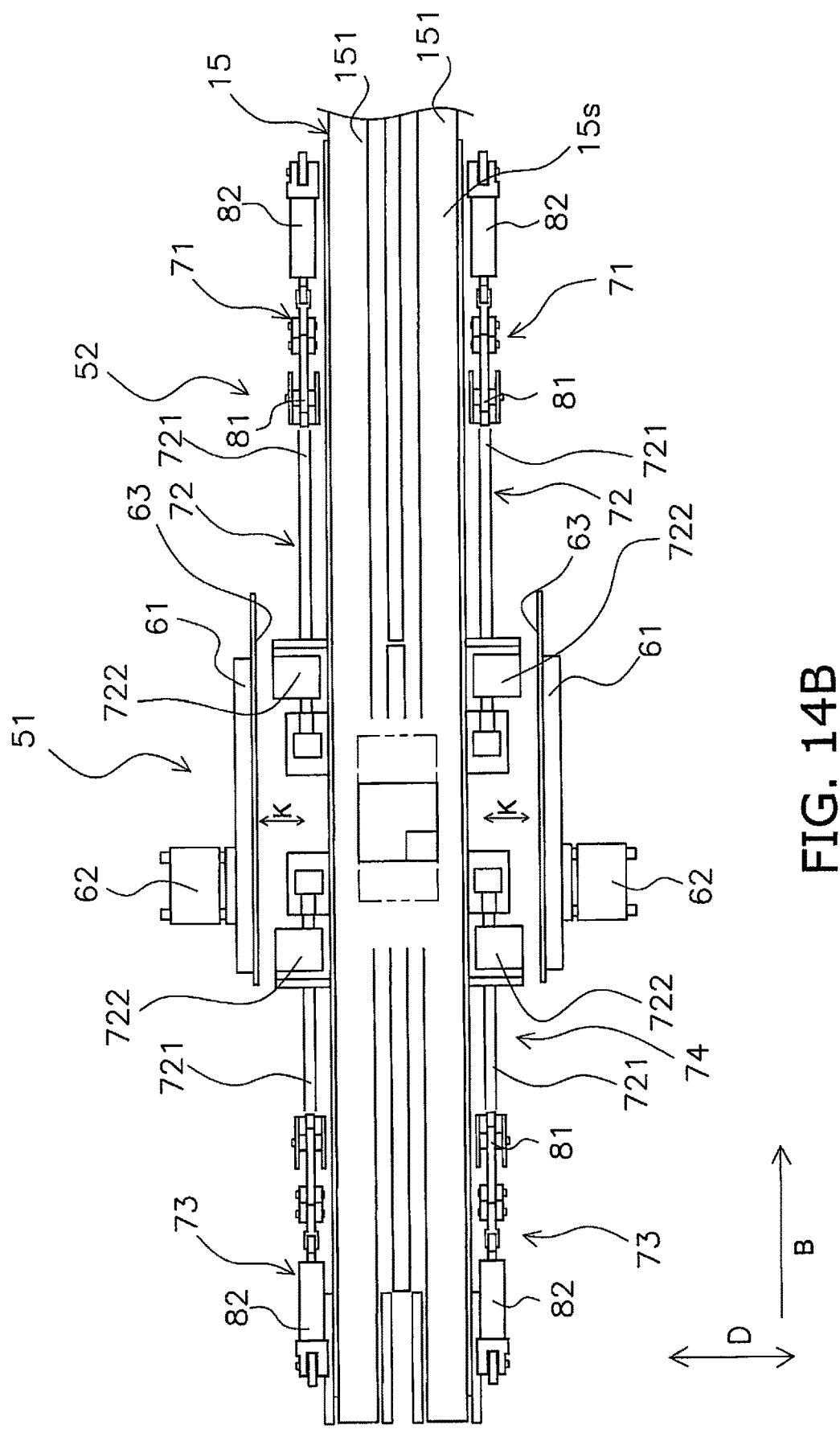
FIG. 14B is a plan view of the position adjuster in FIG. 13.

FIG. 14A is a side view of the configuration of the position adjuster 50, and FIG. 14B is a plan view of the configuration of the position adjuster 50. As shown in the drawings, the position adjuster 50 has a width direction position adjuster 51 and a conveyance direction position adjuster 52. The belt feeder 15 in this embodiment has a plurality of belts 151 disposed side by side in the width direction D.

Width Direction Position Adjuster 51

Figure 14C:
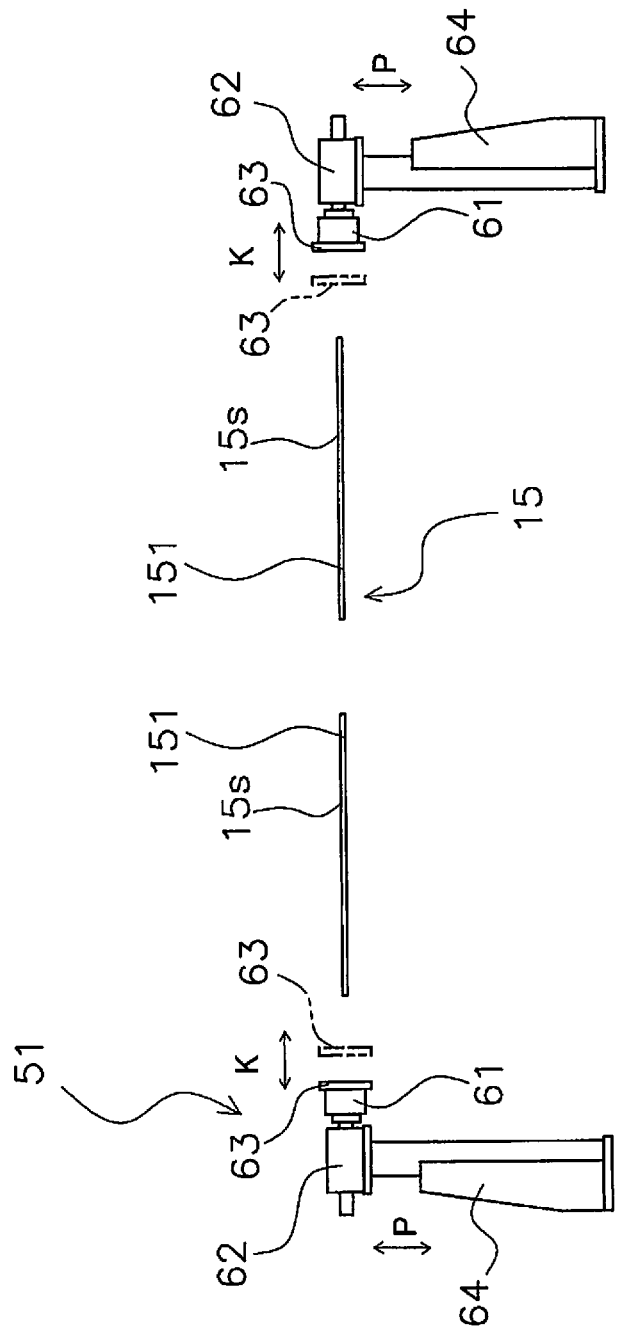
FIG. 14C is a diagram showing the positional relation between the belt feeder and the width direction position adjuster when viewed along the conveyance direction in the destack feeder system in FIG. 13.

FIG. 14C is a diagram showing the layout relationship between the belt feeder 15 and the width direction position adjuster 51 when viewed along the conveyance direction B. In FIG. 14C, the conveyance direction position adjuster 52 is not depicted, to make the drawing easier to understand.

As shown in FIGS. 14B and 14C, the width direction position adjuster 51 has a pair of pressing components 61, an air cylinder 62 provided to each of the pressing components 61, and a vertical movement mechanism 64. The pressing components 61 each have a pressing face 63 formed substantially parallel to the conveyance direction B of the belt feeder 15. The pair of pressing faces 63 are disposed opposite each other in the width direction D. When the two air cylinders 62 are simultaneously extended, the conveyed workpiece W is pushed from both sides in the width direction D by the pair of pressing faces 63 and is centered in the width direction D (see the arrow K). In FIG. 14C, the extended pressing faces 63 are indicated by two-dot chain lines.

The vertical movement mechanism 64 moves the pressing components 61 up and down (see the arrow P), moving them between a position where they protrude from the upper face 15s of the belt feeder 15 (the position shown in FIG. 14C) and a position lower than the upper face 15s of the belt feeder 15. That is, in moving the workpiece W to the specified position, the vertical movement mechanism 64 causes the pressing components 61 to protrude from the upper face 15s of the belt feeder 15, and at other times positions them lower than the upper face 15s of the belt feeder 15. The vertical movement mechanism 64 may be constituted by a ball screw or the like, or by a belt or the like, with no particular limitations thereon.

Conveyance Direction Position Adjuster 52

As shown in FIGS. 14A and 14B, the conveyance direction position adjuster 52 has a pair of downstream centering components 71, a downstream moving component 72 provided to each downstream centering component 71, a pair of upstream centering components 73, and an upstream moving component 74 provided to each upstream centering component 73.

The downstream centering components 71 and the upstream centering components 73 are disposed between the belts 151. In FIG. 14B, only two central belts 151 are shown, and the others are not depicted.

Downstream Centering Components 71, Upstream Centering Components 73

As shown in FIG. 14A, each downstream centering component 71 has a pressing component 81, an air cylinder 82, a link component 83, a base 84, and a link 85. The pressing components 81 each have a pressing face 81a that faces the upstream side in the conveyance direction B and is parallel to the width direction D. The air cylinders 82 each have a cylinder 821 and a rod 822 that moves with respect to the cylinder 821. The air cylinders 82 are disposed along the conveyance direction B, and the rods 822 are disposed downstream from the cylinder 821.

The link component 83 is rotatably linked to the distal end of the rod 822, is rotatably linked to the pressing component 81, and links the rod 822 and the pressing component 81. The link component 83 is supported by the base 84 so as to be rotatable around a shaft 83a. The link component 83 has a first link 831 between the shaft 83a and the rod 822 and a second link 832 between the shaft 83a and the pressing component 81.

The upstream end of the cylinder 821 is fixed to the base 84. The link 85 is rotatably linked to the base 84 and is rotatably linked to the pressing component 81. The link 85 forms a parallel link with the second link 832.

Figure 14D:
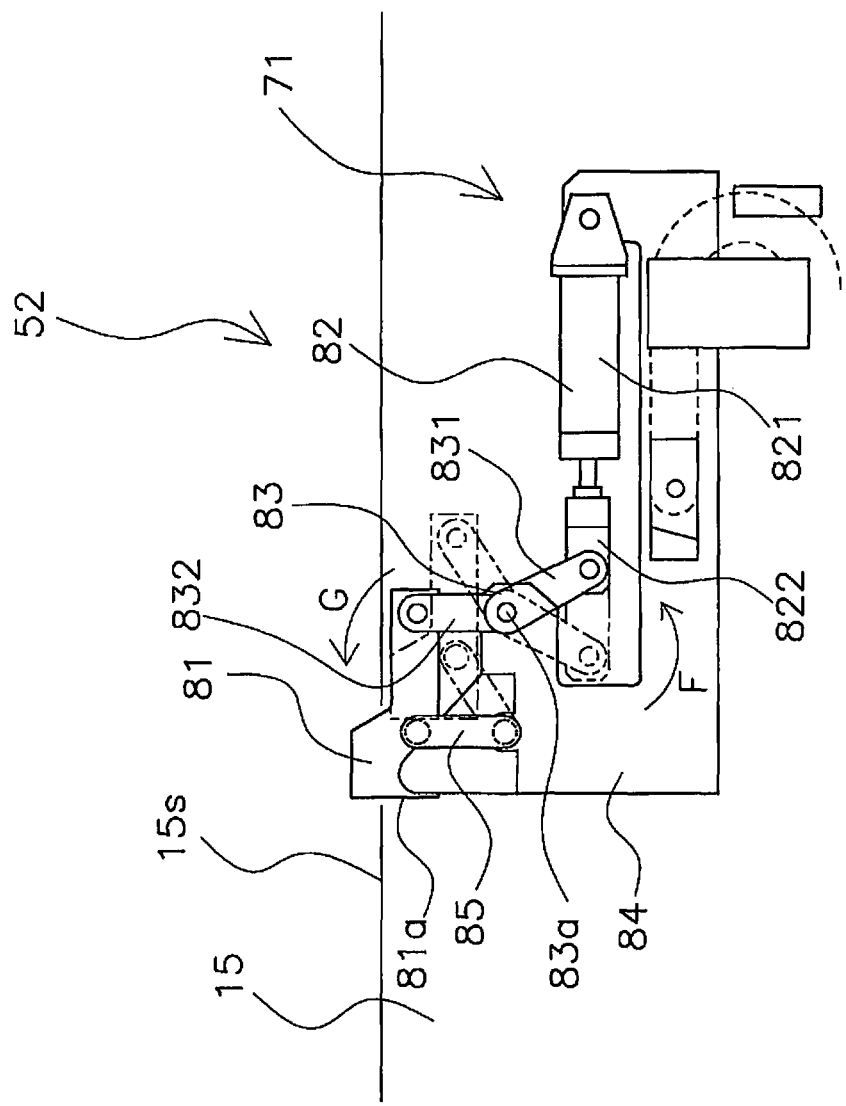
FIG. 14D is a diagram illustrating the operation of the downstream centering component in FIG. 14A.

FIG. 14D is a diagram showing the operation of a downstream centering component 71. In the state shown in FIG. 14A, the pressing component 81 does not protrude from the upper face 15s of the belt feeder 15, so it is in the standby position. In FIG. 14D, the downstream centering component 71 in a standby state is indicated by dotted lines. As shown in FIG. 14D, when the air cylinder 82 is contracted, the link component 83 rotates counterclockwise (see the arrow F) with respect to the shaft 83a. This rotation causes the link 85 to rotate, and the pressing component 81 also rotates counterclockwise. At this point, the pressing component 81 moves to the downstream side while projecting from the upper face 15s of the belt feeder 15 (see the arrow G). Both of the downstream centering components 71 perform the same movement.

Also, the upstream centering components 73 have the same configuration as the downstream centering components 71, and are disposed symmetrically with respect to the conveyance direction B. Therefore, the pressing components 81 of the upstream centering components 73 move to the downstream side while protruding from the upper face 15s of the belt feeder 15. In FIG. 14A, the upstream centering component 73 disposed in the standby position is indicated by dotted lines, and the upstream centering component 73 when the pressing component 81 protrudes from the upper face 15s of the belt feeder 15 is indicated by solid lines.

Thus, the workpiece W is clamped and pushed from the upstream side and the downstream side in the conveyance direction and disposed in the specified position by the pressing components 81 of the pair of downstream centering components 71 and the pressing components 81 of the pair of upstream centering components 73.

Downstream Movement Component 72, Upstream Movement Component 74

Also, since the stroke of the air cylinders 82 is short, the downstream moving components 72 move the downstream centering components 71 in the upstream or downstream direction of the conveyance direction B. As shown in FIG. 14A, a downstream moving component 72 includes a ball screw 721 and a motor 722. A through-hole is formed in the base 84 along the conveyance direction B, and the inner peripheral face of the through-hole is threaded. The ball screw 721 is disposed along the conveyance direction B and is inserted into the base 84. The ball screw 721 is threaded into the threads formed in the through-hole. The motor 722 rotationally drives the ball screw 721. The ball screw 721 is fixed to the frame of the belt feeder 15. When the motor 722 is rotated, the ball screw 721 rotates, and the base 84 into which the ball screw 721 is threaded moves along the conveyance direction B. Consequently, the downstream centering component 71 moves upstream or downstream along the conveyance direction B. In FIG. 14A, the downstream centering component 71 that has moved in the upstream direction is indicated by two-dot chain lines.

The upstream moving components 74 have the same configuration as the downstream moving components 72, and move the downstream centering components 71 along the conveyance direction B. In FIG. 14A, the upstream centering component 73 that has moved in the downstream direction is indicated by two-dot chain lines.

Thus, the positions of the downstream centering components 71 and the upstream centering components 73 are adjusted by the downstream moving components 72 and the upstream moving components 74 on the basis of the shape of the workpiece W, and when the four air cylinders 82 are contracted, the workpiece W is pushed by the pressing components 81 from the upstream side and the downstream side, and the workpiece W moves to the specified position in the conveyance direction B. By simultaneously extending the two air cylinders 62, the workpiece W is pushed from both sides in the width direction D by the pressing components 61, and the workpiece W moves to the center position in the width direction D. This is how the position of the workpiece W is adjusted.

Controller 19'

As in the Embodiment 1, the controller 19' in Embodiment 2 has the workpiece determination component 191, the first position sensor 192, and the first storage component 193, but differs from the controller 19 in Embodiment 1 in that it does not have the second position sensor 194 or the second storage component 195. The controller 19' transmits an operation command to the position adjuster 50 at the point when the workpiece W reaches the correction position 15*b*.

Operation

Figure 15:
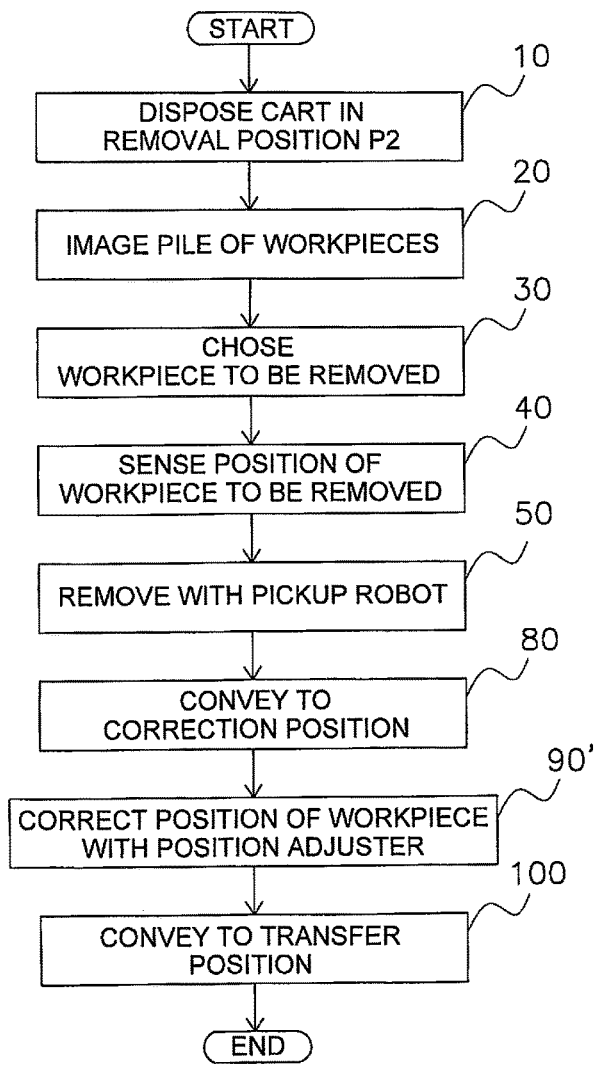
FIG. 15 is a flowchart of the operation of the destack feeder system in FIG. 13.

The operation of the destack feeder system 2 in Embodiment 2 will be described. FIG. 15 is a flowchart of the operation of the destack feeder system 2 in Embodiment 2. Steps S10 to S50 are the same as in Embodiment 1 and will not be described again. After step S50, in step S80 the workpiece W is conveyed to the correction position 15*b* by the belt feeder 15.

Next, in step S90', the position of the workpiece W on the belt feeder 15 is adjusted by the position adjuster 50.

Next, in step S100, the workpiece W is conveyed to the transfer position 15*c* by the belt feeder 15.

As described above, in Embodiment 2, unlike in the first embodiment, the position adjuster 50 is operated and position adjustment is performed in the same way for all of the workpieces W that are conveyed in, regardless of how much positional deviation there is.

Features, Effects, etc.

(1)

The destack feeder systems 1 and 2 (an example of a workpiece conveying system) in these embodiments comprise the cart 10 (an example of a disposition component), the monocular camera 12 (an example of a first imaging component), the first position sensor 192, the pickup robot 16*a* (an example of a first removal component), the belt feeder 15 (an example of a conveyor), and the position adjusters 20 and 50. A plurality of workpieces W are placed on the cart 10. The monocular camera 12 images the workpieces W on the cart 10. The first position sensor 192 senses the position of a workpiece W removed from the cart 10 on the basis of the captured image. The belt feeder 15 conveys the workpieces W removed from the cart 10. The pickup robot 16*a* removes a workpiece W whose position has been sensed from the cart 10 and places it on the belt feeder 15. The position adjusters 20 and 50 adjust the positions of the workpieces W placed on the belt feeder 15.

In this manner, the position of a workpiece W is sensed on the basis of the image captured by the monocular camera 12, and the workpiece W is removed. Since the image captured by a monocular camera is used, the calculation processing for the position of the workpiece takes less time. On the other hand, there will be a certain amount of error in the position of the workpiece W in the calculation processing due to the image information produced by the monocular camera 12, but as long as the approximate position of the workpiece W can be sensed, the workpiece W can be removed and placed on the belt feeder 15.

Also, the workpiece W can be accurately fed to a position in a press device, for example, by adjusting the position on the belt feeder 15 with respect to a workpiece W that has been removed.

In addition, since the next workpiece W can be removed while position adjustment is being performed, the time involved can be shortened and the process is faster.

(2)

The destack feeder systems 1 and 2 (an example of a workpiece conveying system) in these embodiments further comprise the irradiation component 13. The irradiation component 13 irradiates light onto a plurality of workpieces W on the cart 10 (an example of a disposition component). The monocular camera 12 (an example of a first imaging component) captures images of the workpieces W irradiated with light by the irradiation component 13.

This allows the workpiece W to be removed to be chosen on the basis of the reflection of light by the workpieces W.

(3)

With the destack feeder systems 1 and 2 (an example of a workpiece conveying system) in these embodiments, a plurality of workpieces W are disposed in a pile on the cart 10 (an example of a disposition component).

Thus, workpieces W can be removed even when the workpieces W are piled up. In these embodiments the workpieces W are disposed in a pile, but this is not the only option.

(4)

The destack feeder system 1 (an example of a workpiece conveying system) in this embodiment comprises the second position sensor 194, and the position adjuster 20 has the monocular camera 17 (an example of a second imaging component) and the position corrector 18. The monocular camera 17 images the workpieces W placed on the belt feeder 15 (an example of a conveying component). The position corrector 18 corrects the position of a workpiece W so as to arrange the workpiece in a specified position. The second position sensor 194 senses positional deviation from the specified position of the workpiece W on the belt feeder 15 on the basis of the image captured by the monocular camera 17.

Since imaging is performed by the monocular camera 17 in a state in which the workpieces are placed on the belt feeder 15, the positions of the workpieces W in the height direction is fixed, so even the monocular camera 17 can accurately sense the position in a horizontal plane. The workpieces W can also be moved to the specified position on the belt feeder 15.

(5)

With the destack feeder system 2 (an example of a workpiece conveying system) of this embodiment, the position adjuster 50 moves the workpiece W to a specified position on the belt feeder 15 (an example of a conveying component).

As a result, the workpiece W can be moved to the specified position on the belt feeder 15.

(6)

With the destack feeder systems 1 and 2 (an example of a workpiece transfer system) in these embodiments, the irradiation component 13 has the red LEDs 13*a* and 13*b* (an example of LEDs), and the plurality of workpieces W are irradiated with light from the red LEDs 13*a* and 13*b*.

This allows the workpieces W to be irradiated with light from the red LEDs 13*a* and 13*b*, the workpieces W to be removed to be chosen.

Also, using red light, which has a long wavelength, reduces light scattering and facilitates sensing.

(7)

The destack feeder systems 1 and 2 (an example of a workpiece conveying system) in these embodiments further comprise the blackout screen 14. The blackout screen 14 covers the workpieces W and the irradiation component 13. This reduces the influence of external light.

(8)

With the destack feeder systems 1 and 2 (an example of a workpiece conveying system) in these embodiments, the removal position P2 of the cart 10 (an example of a disposition component) when a workpiece W is removed is disposed side by side with the belt feeder 15 (an example of a conveyor) in the workpiece conveyance direction B. The pickup robot 16*a* (an example of a first removal component)

is disposed side by side with the upstream end 15e of the belt feeder 15 in the width direction D of the belt feeder 15. The monocular camera 12 is disposed above the cart 10 in the removal position P2 (an example of the position where workpieces are removed).

Consequently, a workpiece W can be imaged by the monocular camera 12 on the cart 10 disposed at the removal position P2. Also, the removed workpiece W can be conveyed toward a press device, for example, by the belt feeder 15.

(9)

The destack feeder systems 1 and 2 (an example of a workpiece transfer system) in these embodiments further comprise a pickup robot 16b (an example of a second removal component). The pickup robot 16b is opposite the pickup robot 16a (an example of a first pickup component) and is disposed side by side with the upstream end 15e of the belt feeder 15 (an example of a conveyor) in the width direction D, and a workpiece W whose position has been detected is removed from the cart 10 and placed on the belt feeder 15.

Thus providing two pickup robots further increases the speed of the operation.

(10)

The destack feeder system 1 (an example of a workpiece conveying system) in this embodiment comprises the second position sensor 194, and the position adjuster 20 has the monocular camera 17 (an example of a second imaging component) and the position corrector 18. The monocular camera 17 images a workpiece W placed on the belt feeder 15 (an example of a conveyor). The position corrector 18 corrects the position of the workpiece W so that the workpiece will be disposed in the specified position. The second position sensor 194 senses positional deviation of the workpiece W from the specified position on the belt feeder 15 on the basis of the image captured by the monocular camera 17. The monocular camera 17 is disposed above the upstream end 15e of the belt feeder 15.

Consequently, the position of the workpiece W placed on the belt feeder 15 can be sensed by the monocular camera 17. Since the image is captured by the monocular camera 17 in a state in which the workpieces are on the belt feeder 15, the position of the workpieces W in the height direction is fixed, so even the monocular camera 17 can accurately sense the position in a horizontal plane.

(11)

The workpiece conveying method in this embodiment has step S20 (an example of an imaging step), step S40 (an example of a position sensing step), step S50 (an example of a removal step), and steps S60, S70, S80, and S90 (an example of a position adjustment step) or steps S80 and S90' (an example of a position adjustment step). In step S20 (an example of an imaging step), a plurality of workpieces W are imaged by the monocular camera 12. In step S40 (an example of a position sensing step), the position of the workpiece W to be removed from among the plurality of workpieces W is sensed on the basis of the captured image. In step S50 (an example of a removal step), the workpiece W whose position was sensed is removed from among the plurality of workpieces W and placed on the belt feeder 15 (an example of a conveyor) that conveys the workpieces W. Steps S60, S70, S80, and S90 (an example of a position adjustment step) or S80 and S90' (an example of a position adjustment step) adjust the position of the workpieces W placed on the belt feeder 15.

Thus, the positions of the workpieces W are sensed and the workpieces W are removed on the basis of the image captured by the monocular camera 12. Since the image here is one captured by the monocular camera, the time required for the calculation processing of the position of the workpiece can be shortened. On the other hand, there will be a certain amount of error in the position of the workpiece W in the calculation processing due to the image information produced by the monocular camera 12, but as long as the approximate position of the workpiece W can be sensed, the workpiece W can be removed and placed on the belt feeder 15.

Also, the workpiece W can be accurately fed to a position in a press device, for example, by adjusting the position on the belt feeder 15 with respect to a workpiece W that has been removed.

In addition, since the next workpiece W can be removed while position adjustment is being performed, the time involved can be shortened and the process is faster.

4. Other Embodiments

Embodiments of the present disclosure were described above, but the present invention is not limited to or by the above embodiments, and various modifications are possible without departing from the gist of the present invention.

(A)

In the above embodiments, the irradiation component 13 has the red LEDs 13a and 13b, but red is not the only option, and the irradiation component 13 may have blue LEDs, for example. In the above embodiments, two LEDs are provided, but the number is not limited to two.

(B)

In the above embodiments, two pickup robots 16a and 16b are used, but the number of pickup robots is not limited to two, and may be one, or may be three or more.

(C)

In the above embodiments, the monocular camera 12 is used as an example of the first imaging component, but a monocular camera is not the only option, and what is important is that position sensing is performed with image information that includes few enough errors to allow removal with the pickup robots 16a and 16b. That is, even if a compound eye camera is used, the image information used for position sensing should be reduced so that high-speed processing can be performed. The same applies to the second imaging component, and it is not limited to the monocular camera 12, but in order to perform processing at high speed, it is preferable to reduce the image information that is transmitted to the controller 19.

(D)

In the above embodiments, the cart 10 is used as an example of a disposition component, but a movable cart is not the only option, and a box or stand for disposing the workpieces W in the removal position P2 may be provided.

(E)

The controller 19 in the above embodiments is provided to a computer or the like, for example, but need not be disposed near the pickup robots 16a and 16b or the belt feeder 15, and may be disposed at any location.

(F)

A program for causing a computer to execute some or all the functions of the workpiece determination component 191, the first position sensor 192, the first storage component 193, the second position sensor 194, and the second storage component 195 of the controller 19 in Embodiment 1 may be provided. This program operates in conjunction with the computer. Similarly, a program may also be provided in Embodiment 2.

Also, in the above embodiments, the workpiece conveying method is described through reference to the flowcharts shown in FIGS. 12 and 15, but this is not the only option.

For example, the present invention may be implemented as a program that causes a computer to execute a workpiece conveying method that is carried out according to the flowcharts shown in FIGS. 12 and 15.

Also, one usage mode of the program may be a mode in which the program is recorded to a recording medium such as a ROM that can be read by a computer, and operates in conjunction with the computer.

Also, one usage mode of the program may be a mode in which the program is transmitted through a transmission medium such as the Internet, or a transmission medium such as light, radio waves, sound waves, or the like, is read by a computer, and operates in conjunction with the computer.

Also, the computer described above is not limited to hardware such as a CPU (central processing unit), and may instead encompass firmware, an OS, and peripheral devices.

As described above, the function of the controller or the workpiece conveying method may be realized by software or by hardware.

The workpiece conveying system and the workpiece conveying method of the present invention have the effect of affording an increase in speed, and are useful in a conveyance device for transporting workpieces to a press device, or the like.

The invention claimed is:

1. A workpiece conveying system, comprising:
a disposition component, a plurality of workpieces being disposable on the disposition component;
a first imaging component configured to capture an image of workpieces on the disposition component;
a first position sensor configured to sense a position of a workpiece to be removed from the disposition component based on the captured image;
a conveyor configured to convey the workpiece removed from the disposition component;
a first removal component configured to remove from the disposition component a workpiece whose position has been sensed and to place the workpiece on the conveyor;
a position adjuster configured to adjust a position of the workpiece placed on the conveyor; and
an irradiation component configured to irradiate the workpieces on the disposition component with light, the irradiation component including an LED,
the first imaging component being configured to capture the image of the workpieces in a state of being irradiated with light by the irradiation component, and
the LED being configured to irradiate the workpieces with light from the LED.

2. The workpiece conveying system according to claim 1, wherein
the first imaging component is a monocular camera.

3. The workpiece conveying system according to claim 1, wherein
the workpieces are disposed in a bulk state on the disposition component.

4. The workpiece conveying system according to claim 1, wherein
the position adjuster includes
a second position sensor having a second imaging component configured to capture an image of a workpiece placed on the conveyor, and
a position corrector configured to correct a position of the workpiece so that the workpiece is disposed in a specified position,
the second position sensor being configured to sense positional deviation of the workpiece from the specified position on the conveyor based on the image captured by the second imaging component.

5. The workpiece conveying system according to claim 4, wherein
the second imaging component is a monocular camera.

6. The workpiece conveying system according to claim 1, wherein
the position adjuster moves the workpiece to the specified position on the conveyor.

7. The workpiece conveying system according to claim 1, wherein
the LED is a red LED.

8. The workpiece conveying system according to claim 1, wherein
a position of the disposition component when the workpieces are removed is aligned with the conveyor along a conveyance direction of the workpieces,
the first removal component is disposed next to an upstream end of the conveyor along a width direction of the conveyor, and
the first imaging component is disposed above the disposition component at the position where the workpieces are removed.

9. The workpiece conveying system according to claim 8, further comprising
a second removal component configured to be disposed opposite the first removal component and next to the upstream end of the conveyor along the width direction,
the second removal component being configured to remove from the disposition component a workpiece whose position has been sensed and to place the workpiece on the conveyor.

10. The workpiece conveying system according to claim 8, wherein
the position adjuster includes
a second position sensor having a second imaging component configured to capture an image of a workpieces placed on the conveyor, and
a position corrector configured to correct a position of the workpiece so that the workpiece is disposed in a specific position,
the second position sensor being configured to sense positional deviation of the workpiece from the specified position on the conveyor based on the image captured by the second imaging component, and
the second imaging component being disposed above the upstream end of the conveyor.

11. A workpiece conveying system, comprising:
a disposition component, a plurality of workpieces being disposable on the disposition component;
a first imaging component configured to capture an image of workpieces on the disposition component;
a first position sensor configured to sense a position of a workpiece to be removed from the disposition component based on the captured image;
a conveyor configured to convey the workpiece removed from the disposition component;
a first removal component configured to remove from the disposition component a workpiece whose position has been sensed and to place the workpiece on the conveyor;

a position adjuster configured to adjust a position of the workpiece placed on the conveyor;

an irradiation component configured to irradiate the workpieces on the disposition component with light; and a blackout screen configured to cover the workpieces and the irradiation component, the first imaging component being configured to capture the image of the workpieces in a state of being irradiated with light by the irradiation component.

12. A workpiece conveying method, comprising:

capturing an image of a plurality of workpieces using an imaging component in which the plurality of workpieces are in a state of being irradiated with light from an LED;

sensing a position of a workpiece to be removed from the plurality of workpieces based on the captured image;

removing from among the plurality of workpieces a workpiece whose position has been sensed and placing the workpiece on a conveyor configured to convey the workpiece; and adjusting a position of the workpieces placed on the conveyor.

* * * * *